United States Patent
Yamamoto et al.

(10) Patent No.: US 6,916,269 B2
(45) Date of Patent: Jul. 12, 2005

(54) SYSTEM AND METHOD OF CONTROLLING LINE PRESSURE FOR V-BELT TYPE CONTINUOUSLY VARIABLE TRANSMISSION

(75) Inventors: Masahiro Yamamoto, Kanagawa (JP); Midori Yamaguchi, Kanagawa (JP); Toshiji Iida, Kanagawa (JP); Tatsuo Wakahara, Kawasaki (JP); Makoto Sawada, Kanagawa (JP)

(73) Assignee: Jatco Ltd., Fuji (JP)

( * ) Notice: Subject to any disclaimer, the term of this patent is extended or adjusted under 35 U.S.C. 154(b) by 0 days.

(21) Appl. No.: 10/654,615

(22) Filed: Sep. 4, 2003

(65) Prior Publication Data

US 2004/0116245 A1 Jun. 17, 2004

(30) Foreign Application Priority Data

Sep. 5, 2002 (JP) ...................................... 2002-260196
Sep. 5, 2002 (JP) ...................................... 2002-260200

(51) Int. Cl.[7] .............................................. B60K 41/12
(52) U.S. Cl. ........................................... 477/46; 477/45
(58) Field of Search .......................... 477/44–6; 701/61, 701/64

(56) References Cited

U.S. PATENT DOCUMENTS

| 4,536,171 | A | * | 8/1985 | Tanaka et al. | 477/48 |
| 4,710,879 | A | * | 12/1987 | Vahabzadeh | 701/61 |
| 4,729,103 | A | * | 3/1988 | Oshiage et al. | 701/61 |
| 5,788,599 | A | * | 8/1998 | Adachi et al. | 477/46 |
| 5,931,884 | A | * | 8/1999 | Ochiai | 477/46 |
| 6,042,501 | A | * | 3/2000 | Yamamoto | 477/48 |
| 6,846,266 | B2 | * | 1/2005 | Iida et al. | 477/44 |

FOREIGN PATENT DOCUMENTS

JP          8-178042 A          7/1996

* cited by examiner

Primary Examiner—Roger Pang
(74) Attorney, Agent, or Firm—Foley & Lardner LLP

(57) ABSTRACT

In a V-belt type CVT, an actual-shift-ratio corresponding operated position of a step motor is calculated through conversion of an actual shift ratio expressed by the rotational-speed ratio between primary and secondary pulleys. A displacement amount is calculated between the actual-shift-ratio corresponding operated position of the step motor and an actual position thereof. A correction amount of the line pressure is calculated to reduce the displacement amount, and the line pressure is corrected in accordance therewith.

34 Claims, 19 Drawing Sheets

WHEN HAVING NO STEP-MOTOR MOUNTING ERROR

WHEN LACKING LINE PRESSURE

SYSTEM AND METHOD OF CONTROLLING LINE PRESSURE FOR V-BELT TYPE CONTINUOUSLY VARIABLE TRANSMISSION

BACKGROUND OF THE INVENTION

The present invention relates to a line-pressure control system for a V-belt type continuously variable transmission (CVT), which allows correction of the line pressure or source pressure for shift control of the CVT.

The V-belt type CVT comprises a primary pulley for receiving engine rotation, a secondary pulley coupled to wheels and having a V-groove aligned with that of the primary pulley, and a V-belt looped over the primary and secondary pulleys to engage in the V-grooves. The primary pulley, the secondary pulley, and the V-belt constitute a power train. In order to allow speed conversion of the power train, one of the flanges for defining the V-groove of each of the primary and secondary pulleys includes a stationary flange, and another includes a movable flange which can be displaced axially. The movable flanges are biased toward the stationary flanges by the primary-pulley pressure and the secondary-pulley pressure produced from the line pressure as source pressure, putting the V-belt in frictional engagement with the pulley flanges, thus allowing power transfer between the primary and secondary pulleys.

At the time of shifting, a shift actuator comprising typically a step motor is moved to an operated position, i.e. by a given step number, corresponding to a target shift ratio, producing between the primary-pulley pressure and the secondary-pulley pressure a differential pressure corresponding to the target shift ratio, changing the width of the V-grooves, thus achieving the target shift ratio. Using the Step-Ip characteristic shown in FIG. 10, a required step number Step of the step motor is looked up in accordance with a target shift ratio Ip corresponding to the driving conditions.

Since the line pressure serving as source pressure of the primary and secondary pressures adopts as a medium hydraulic oil out of an oil pump driven by the engine, the magnitude of the line pressure has a great effect on engine fuel consumption. Thus, it is commonly designed to control the line pressure controlled at a minimum value.

Due to determination of the line pressure, the possibility of deficient line pressure caused, e.g. by hardware variations cannot be removed completely. In that case, referring to FIG. 11 wherein the Step-Ip characteristic in FIG. 10 is shown by broken line, displacement occurs as shown by solid line in FIG. 11. Thus, even for achieving the same target shift ratio Ip, it is required to command the step motor by increasing the step number Step by an excess a, leading to delayed achievement of the target shift ratio Ip or impossible achievement thereof when the maximum-speed or highest shift ratio is required (hereafter refer to as "highest-shift-ratio unachieved state").

Referring to FIG. 12, the highest-shift-ratio unachieved state is described with regard to when controlling the differential pressure between the primary-pulley pressure and the secondary-pulley pressure by operation of the primary-pulley pressure as is carried out widely. Referring to FIG. 12, an x-axis designates stroke amount or opening of a shift control valve operated by the step motor, and a y-axis designates hydraulic pressure. When having full line pressure as shown by solid line, the primary-pulley pressure produced from the line pressure as source pressure reaches a required primary-pulley pressure corresponding to the target shift ratio Ip (=highest shift ratio) at a stroke amount L1 as shown by solid line, allowing achievement of the highest shift ratio. On the other hand, when the line pressure is lower than the required primary-pulley pressure corresponding to the target shift ratio Ip (=highest shift ratio) as shown by broken line, the primary-pulley pressure produced from the line pressure as source pressure does not reach the required primary-pulley pressure as shown by broken line, leading to the highest-shift-ratio unachieved state.

Typically, the acting area of the primary-pulley pressure operated at the time of shifting is set roughly twice as large as that of the secondary-pulley pressure for convenience of control. In view of requirement of downsizing of the V-belt type CVT, it is a recent attempt to design the primary-pulley pressure acting area to be equal to the secondary-pulley pressure acting area. In that case, the secondary-pulley pressure is sensed by a sensor to be feedback controlled in accordance therewith, whereas the primary-pulley pressure is feedforward controlled through the shift control valve, rendering the above problem more serious.

SUMMARY OF THE INVENTION

In order to cope with the highest-shift-ratio unachieved state, the line pressure can be increased in accordance with determination that when the step number of the step motor exceeds a predetermined value, an excessive command occurs due to highest-shift-ratio unachieved state. However, this solution is to increase the line pressure only after having the highest-shift-ratio unachieved state, i.e. it deals with that state in a reactive manner. Moreover, since an increasing amount of the line pressure cannot always correspond to a deficiency thereof, a certain margin is needed for the increasing amount, leading to poor fuel consumption. Further, this solution is available when having deficient line pressure, and is not available when having excessive line pressure, providing imperfect correction of the line pressure.

It is, therefore, an object of the present invention to provide a line-pressure control system for a V-belt type CVT, which allows constant correction of the line pressure, thus removing the problem of delayed achievement of the target shift ratio.

The present invention provides generally a V-belt type CVT which comprises: primary and secondary pulleys arranged on input and output sides, the pulleys having V-grooves, the pulleys being subjected to primary-pulley and secondary-pulley pressures produced from a line pressure; a V-belt looped over the primary and secondary pulleys to engage in the V-grooves; a shift actuator having a first position corresponding to a target shift ratio, the shift actuator being operated to the first position to change a width of the V-grooves through a differential pressure between the primary-pulley and secondary-pulley pressures, achieving the target shift ratio; and an electronic control unit (ECU) which controls the shift actuator, the ECU being so constructed as to: calculate a second position of the shift actuator corresponding to an actual shift ratio, the second position being converted from the actual shift ratio expressed by a rotational-speed ratio between the primary and secondary pulleys, calculate a displacement between the second position of the shift actuator and an actual position thereof, calculate a correction amount of the line pressure to reduce the displacement, and correct the line pressure in accordance with the correction amount.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
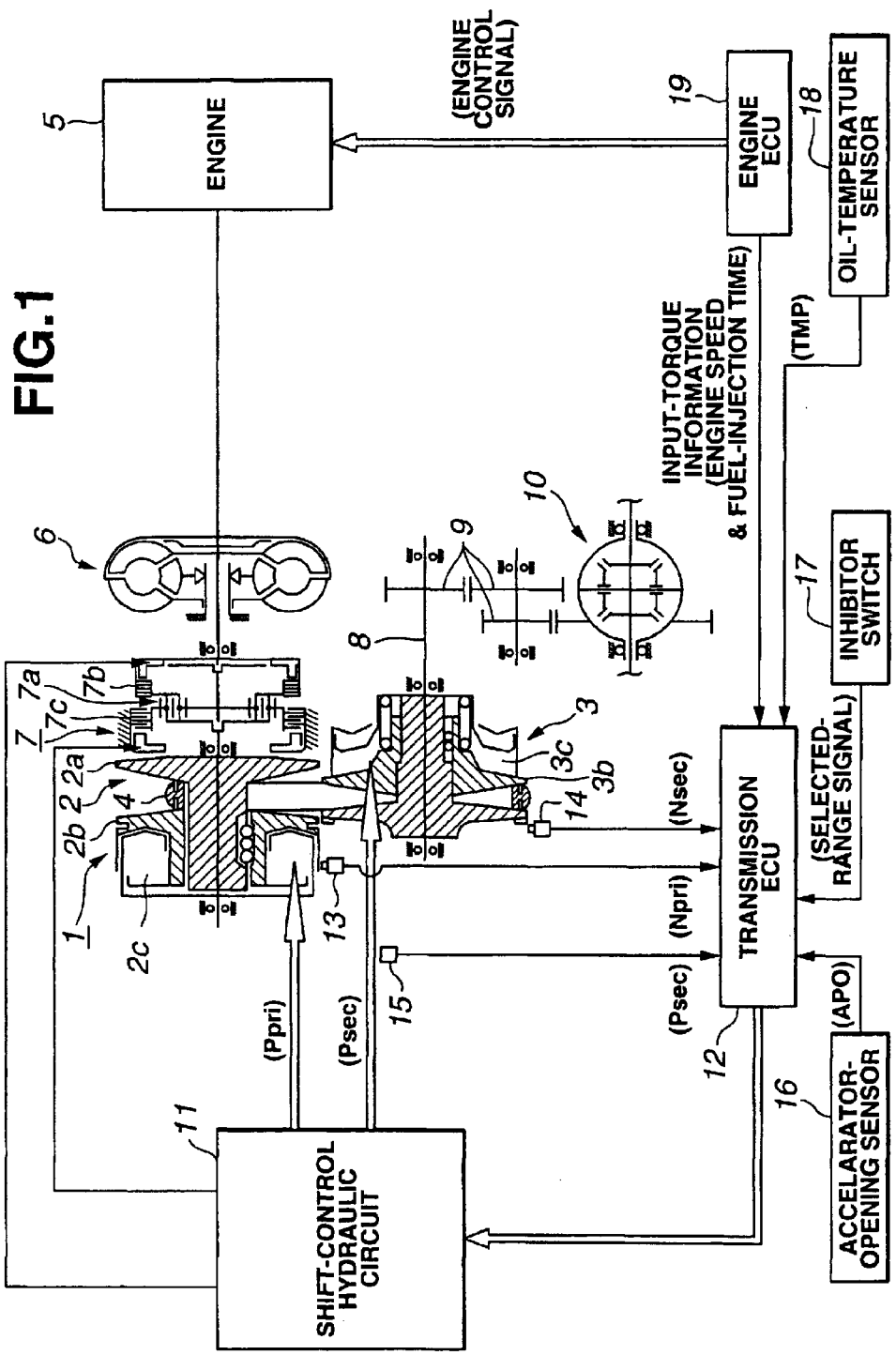
FIG. 1 is a block diagram showing a first embodiment of a line-pressure control system for a V-belt type CVT according to the present invention.

Referring to the drawings, a description is made about a line-pressure control system for a V-belt type CVT embodying the present invention. Referring to FIG. 1, a V-belt type CVT 1 comprises a primary pulley 2, a secondary pulley 3 having a V-groove aligned with that of the primary pulley 2, and a V-belt 4 looped over the primary and secondary pulleys 2, 3 to engage in the V-grooves. An engine 5 is disposed coaxial with the primary pulley 2, and a lockup torque converter 6 and a forward/reverse switching mechanism 7 are arranged between the engine 5 and the primary pulley 2 in this order from the side of the engine 5.

The forward/reverse switching mechanism 7 comprises essentially a double-pinion planetary-gear set 7a including a sun gear coupled to the engine 5 through the torque converter 6 and a carrier coupled to the primary pulley 2. The forward/reverse switching mechanism 7 further comprises a forward clutch 7b for providing direct coupling between the sun gear and the carrier of the planetary-gear set 7a and a reverse brake 7c for fixing a ring gear of the planetary-gear set 7a. When the forward clutch 7b is engaged, the forward/reverse switching mechanism 7 transfers to the primary pulley 2 directly rotation input from the engine 5 through the torque converter 6, whereas when the reverse brake 7c is engaged, the switching mechanism 7 transfers thereto the input rotation as reduced and reversed in direction.

Rotation of the primary pulley 2 is transferred to the secondary pulley 3 through the V-belt 4, which is then transmitted to wheels, not shown, through an output shaft 8, a gear set 9, and a differential gear 10. In order to allow change of the transmission ratio between the primary and secondary pulleys 2, 3 in the process of power transfer, i.e. change of the shift ratio, one of the flanges for defining the V-groove of each of the primary and secondary pulleys 2, 3 includes a stationary flange 2a, 3a, and another includes a movable flange 2b, 3b which can be displaced axially. The movable flanges 2b, 3b are biased toward the stationary flanges 2a, 3b by supplying to a primary-pulley chamber 2c and a secondary-pulley chamber 3c a primary-pulley pressure Ppri and a secondary-pulley pressure Psec produced from the line pressure as source pressure, putting the V-belt 4 in frictional engagement with the pulley flanges, thus allowing power transfer between the primary and secondary pulleys 2, 3. In this embodiment, the pressure acting area of the primary-pulley chamber 2c and that of the secondary-pulley chamber 3c are set equal to each other to avoid one of the pulleys 2, 3 from being larger in diameter than another, achieving downsizing of the V-belt type CVT.

At the time of shifting, the width of the V-belt grooves of the primary and secondary pulleys 2, 3 is changed by a differential pressure between the primary-pulley pressure Ppri and the secondary-pulley pressure Psec produced in accordance with a target shift ratio as will be described later, changing continuously the diameter of circles of the pulleys 2, 3 with respect to the V-belt 4, allowing achievement of the target shift ratio.

A shift-control hydraulic circuit 11 controls output of the primary-pulley pressure Ppri and the secondary-pulley pressure Psec as well as output of the engagement pressure of the forward clutch 7b to be engaged when selecting the forward driving range and the reverse brake 7c to be engaged when selecting the reverse range. The shift-control hydraulic circuit 11 carries out such control in response to a signal of a transmission electronic control unit (ECU) 12. Thus, the transmission ECU 12 receives a signal of a primary-pulley rotational-speed sensor 13 for sensing a primary-pulley rotational speed Npri, a signal of a secondary-pulley rotational-speed sensor 14 for sensing a secondary-pulley rotational speed Nsec, a signal of a secondary-pulley pressure sensor 15 for sensing a secondary-pulley pressure Psec, a signal of an accelerator opening sensor 16 for sensing a accelerator-pedal depression amount APO, a selected-range signal of an inhibitor switch 17, a signal of an oil-temperature sensor 18 for sensing a shift-operation oil temperature TMP, and a transmission input-torque related signal, such as engine speed or fuel injection time, of an engine electronic control unit (ECU) 19 for controlling the engine 5.

Figure 2:
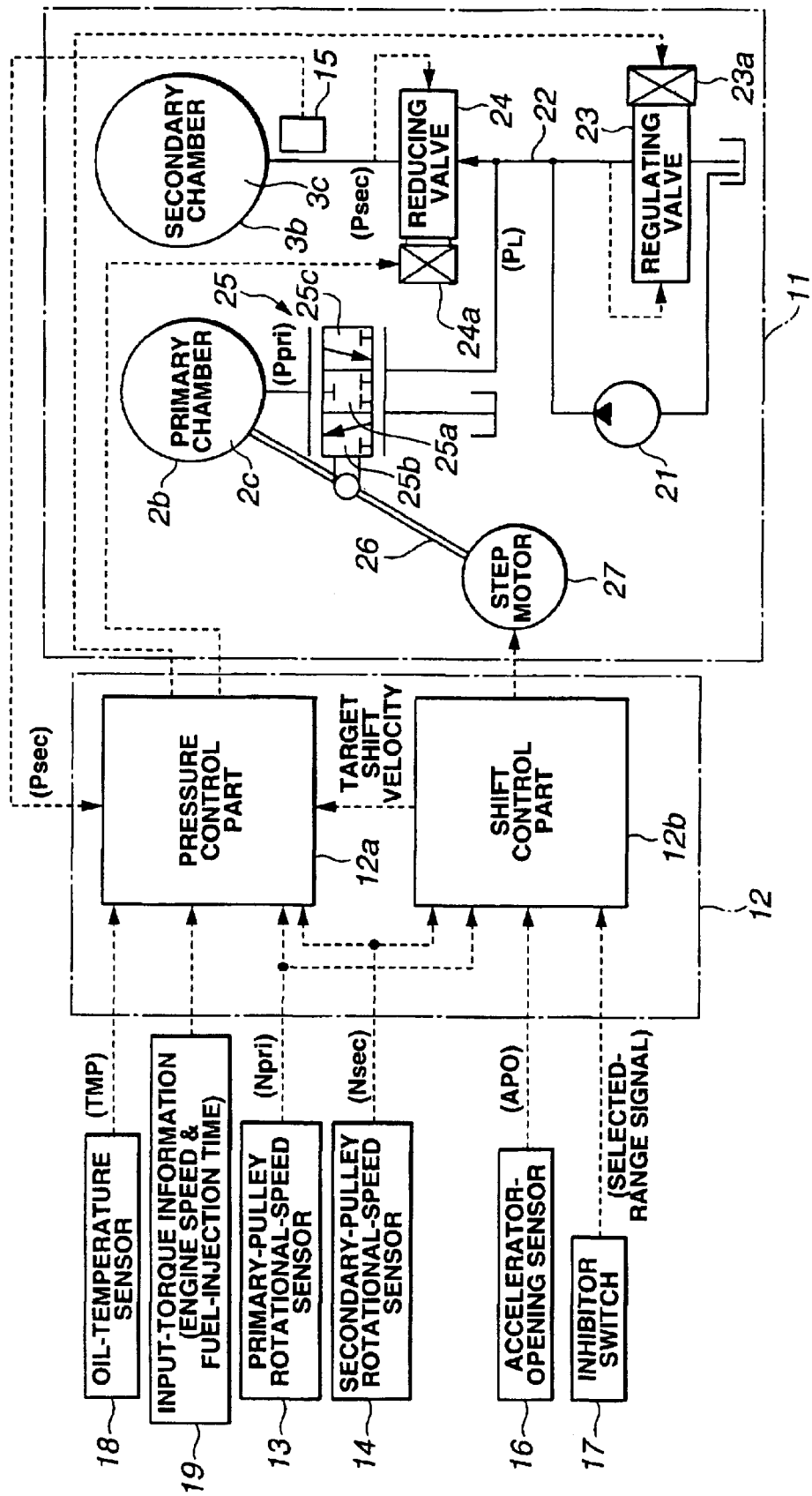
FIG. 2 is a diagram similar to FIG. 1, showing a shift control system.

FIG. 2 shows the shift-control hydraulic circuit 11 and the transmission ECU 12. First, the shift-control hydraulic circuit 11 is described. The hydraulic circuit 11 comprises an oil pump 21 driven by the engine 5, a hydraulic passage 22 to which the oil pump 21 supplies hydraulic oil or medium, and a pressure regulating valve 23 for controlling the pressure within the hydraulic passage 22 at a predetermined line pressure $P_L$. The line pressure $P_L$ within the hydraulic passage 22 is controlled by a pressure reducing valve 24 and supplied to the secondary-pulley chamber 3c as secondary-pulley pressure Psec on one hand, and it is controlled by a shift control valve 25 and supplied to the primary-pulley chamber 2c as primary-pulley pressure Ppri. The pressure regulating valve 23 controls the line pressure $P_L$ in accordance with the drive duty for a solenoid 23a, whereas the pressure reducing valve 24 controls the secondary-pulley chamber Psec in accordance with the drive duty for a solenoid 24a.

The shift control valve 25 has a neutral position 25a, a pressure increasing position 25b, and a pressure reducing position 25c. For switching of the valve positions, the shift control valve 25 is coupled to a shift link 26 roughly in the middle thereof, the shift link 26 having one end coupled to a step motor or shift actuator 27 and another end coupled to the movable flange 2b of the primary pulley 2. The step motor 27 is put in an operated position advanced with respect to a reference position by the step number Step corresponding to the target shift ratio. By such operation of the step motor 27, the shift link 26 swings with a junction with the movable flange 2b as the fulcrum, moving the operated position of the shift control valve 25 from the neutral position 25a to the pressure increasing position 25b or the pressure reducing position 25c. With this, the primary-pulley pressure Ppri is increased by the line pressure $P_L$ as source pressure, or decreased by drain to cause change in differential pressure between the primary-pulley pressure Ppri and the secondary-pulley pressure Psec, producing upshift to a high-side shift ratio or downshift to a low-side shift ratio, thus achieving shift toward the target shift ratio.

Development of shift is fed back to a corresponding end of the shift link 26 through the movable flange 2c of the primary pulley 2, so that the shift link 26 swings with a junction with the step motor 27 as the fulcrum in the direction of returning the shift control valve 25 from the pressure increasing position 25b or the pressure reducing position 25c. With this, the shift control valve 25 is returned to the neutral position 25a when achieving the target shift ratio, allowing maintaining of the target shift ratio.

The transmission ECU 12 carries out determination of the solenoid drive duty of the pressure regulating valve 23, the solenoid drive duty of the pressure reducing valve 24, and a shift command or step number Step to the step motor 27 as well as determination as to whether or not the engagement pressure is supplied to the forward clutch 7b and the reverse brake 7c as shown in FIG. 1. As shown in FIG. 2, the transmission ECU 12 comprises a pressure control part 12a and a shift control part 12b. The pressure control part 12a determines the solenoid drive duty of the pressure regulating valve 23 and the solenoid drive duty of the pressure reducing valve 24 as will be described later, whereas the shift control part 12b determines the step number Step of the step motor 27 as follows:

First, using the vehicle velocity which can be obtained from the secondary-pulley rotational speed Nsec and the accelerator-pedal depression amount APO, the shift control part 12b determines a target input rotational speed in accordance with a given shift map. The determined target input rotational speed is divided by the secondary-pulley rotational speed Nsec to determine a target shift ratio in accordance with the driving conditions such as vehicle velocity and accelerator-pedal depression amount APO. Then, the primary-pulley rotational speed Npri is divided by the secondary-pulley rotational speed Nsec to obtain an actual shift ratio, which is corrected in accordance with a deviation with respect to the target shift ratio, determining a shift-ratio command for gradually bringing the actual shift ratio nearer to the target shift ratio at target shift velocity. The step number Step of the step motor 27 is determined to achieve the shift-ratio command, which is provided to the step motor 27, thus achieving the target shift ratio through the above shift action.

Figure 3:
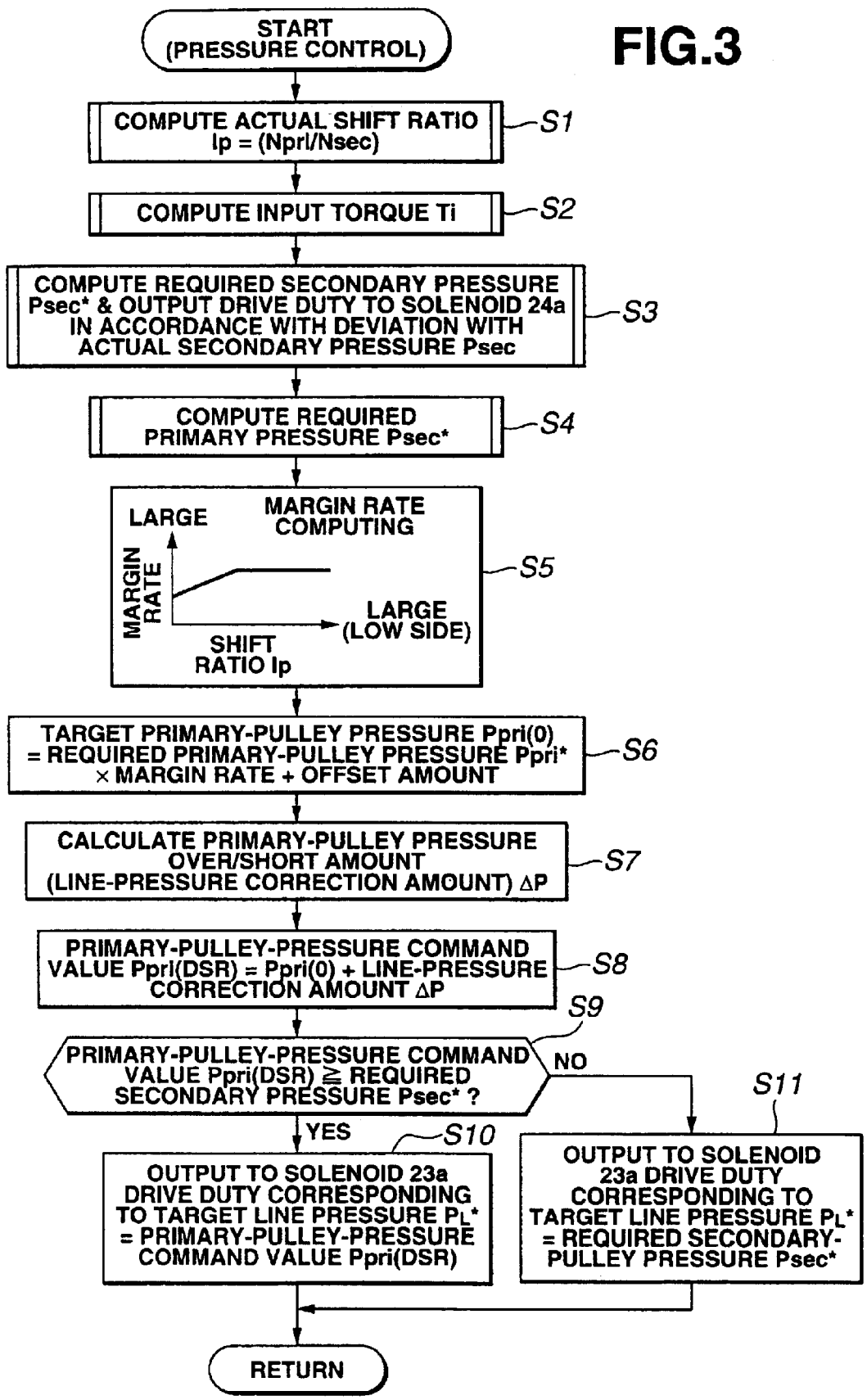
FIG. 3 is a flow chart showing operation of the first embodiment.
Figure 4:
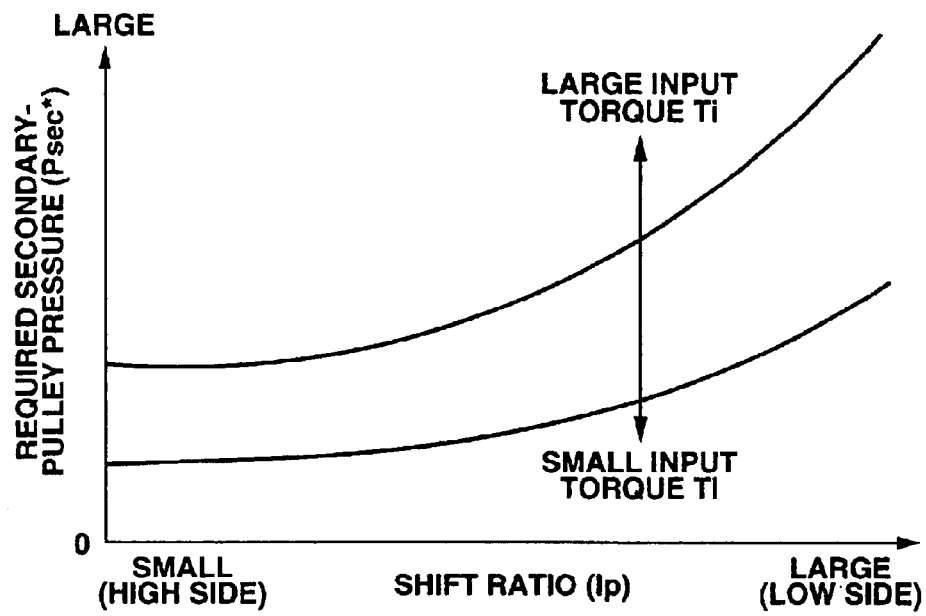
FIG. 4 is a graph illustrating a characteristic of shift ratio vs. required secondary-pulley pressure.

Next, referring to FIG. 3, the pressure control part 12a is described, which repeatedly executes control as shown in FIG. 3 by carrying out a periodic interrupt. First, at a step S1, the primary-pulley rotational speed Npd is divided by the secondary-pulley rotational speed Nsec to determine an actual shift ratio Ip. At a step S2, a transmission input torque Ti is calculated in accordance with input-torque information such as engine speed and fuel injection time derived from the engine ECU 19. At a step S3, a required secondary-pulley pressure Psec* is determined from the actual shift ratio Ip and the input torque Ti in accordance with a map as shown in FIG. 4. By feedback control in accordance with a deviation between the actual secondary-pulley pressure Psec sensed by the sensor 15 and the required secondary-pulley pressure Psec*, the drive duty of the pressure reducing valve 24 is determined to make the actual secondary-pulley pressure Psec coincide with the required secondary-pulley pressure Psec*, which is provided to the solenoid 24a.

Figure 5:
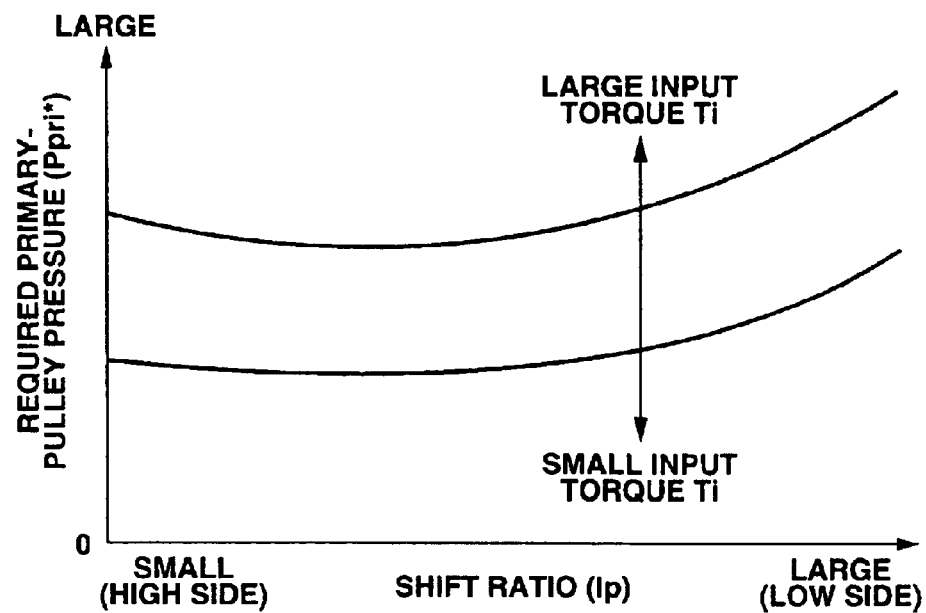
FIG. 5 is a graph similar to FIG. 4, illustrating a characteristic of shift ratio vs. required primary-pulley pressure.

Line-pressure control at a step S4 and subsequent is described, which features the present invention. At the step S4, a required primary-pulley pressure Ppri* is determined from the actual shift ratio Ip and the input torque Ti in accordance with a map as shown in FIG. 5. At a step S5, it is determined from the actual shift ratio Ip in accordance with a given map a margin rate to be given to the primary-pulley pressure Ppri considering a pressure loss at the shift control valve 25. At a step S6, the required primary-pulley pressure Ppri* is multiplied by the margin rate, to which an offset amount or safety part is added, thus determining a target primary-pulley pressure Ppri(0).

Figure 6:
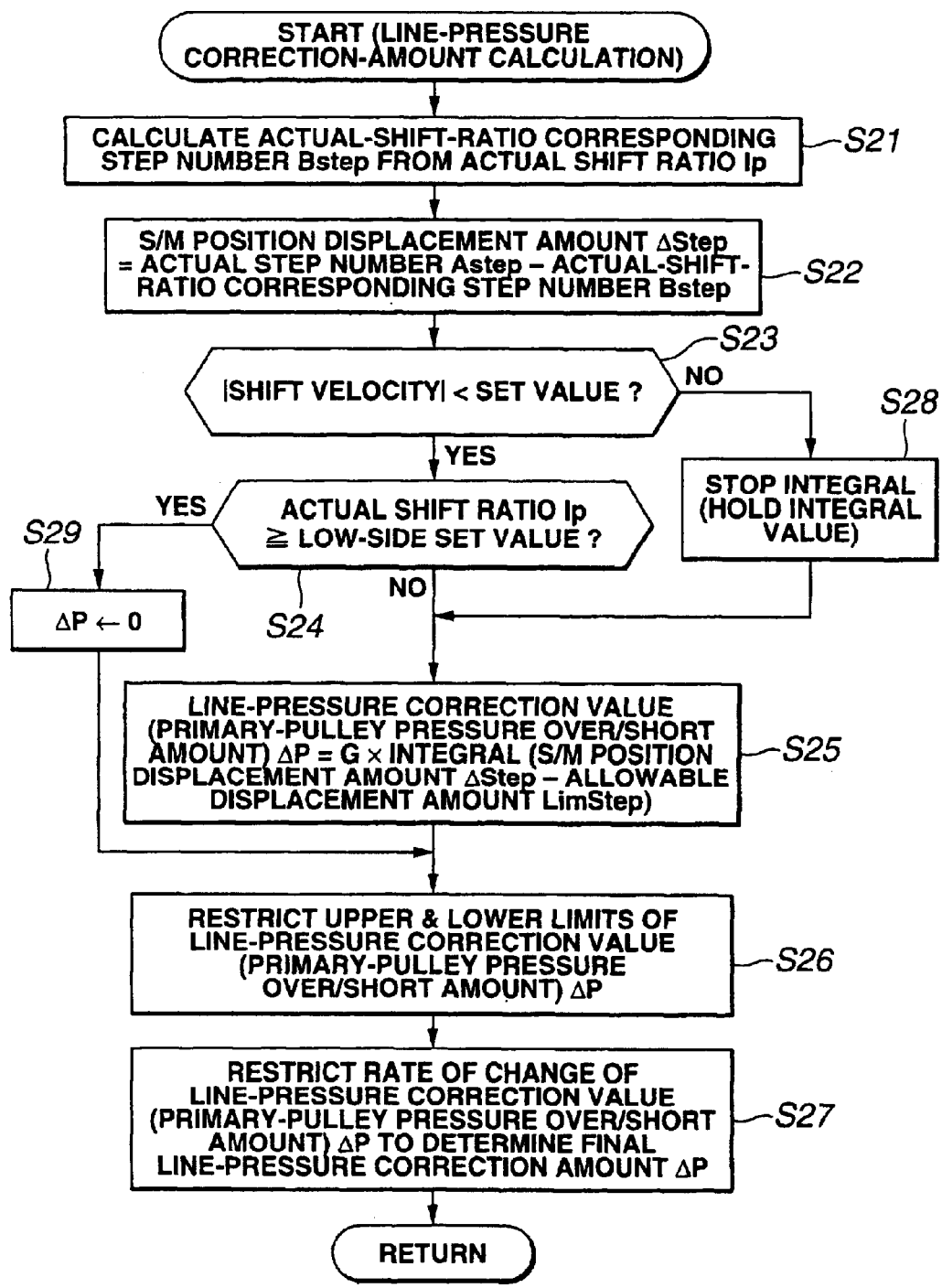
FIG. 6 is a chart similar to FIG. 3, showing operation of the first embodiment.
Figure 7:
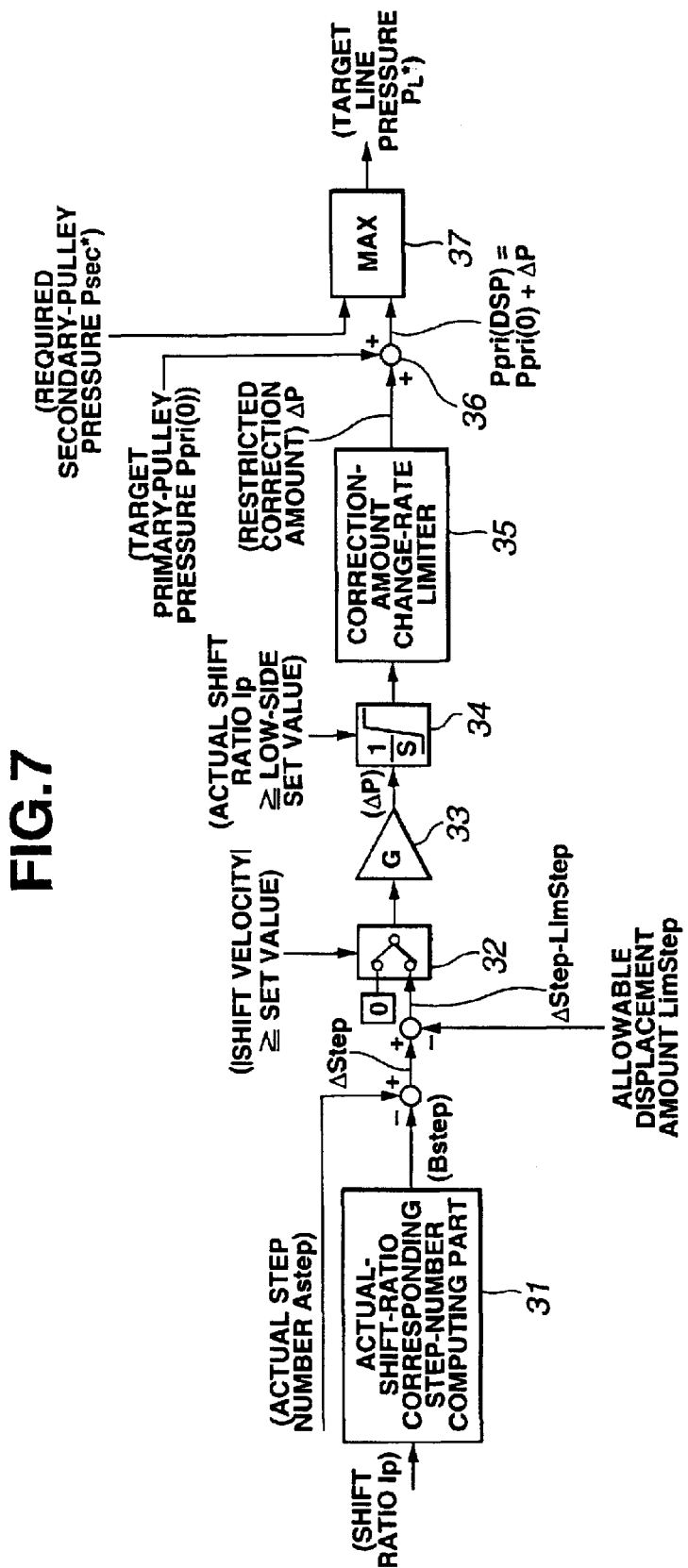
FIG. 7 is a diagram similar to FIG. 2, showing arithmetic processing of a line-pressure correction amount.

At a step S7, referring to FIGS. 6 and 7, a primary-pulley pressure over/short amount or line-pressure correction amount ΔP is calculated as shown in FIGS. 6 and 7. Specifically, referring to FIG. 6, at a step S21, the step number Step of the step motor 27 that it should be at the actual shift ratio Ip, i.e. actual-shift-ratio corresponding step number Bstep or actual-shift-ratio corresponding operated position of the step motor 27, is calculated from the actual shift ratio Ip through inverse conversion to that during shift control. At a step S22, it is calculated a deviation ΔStep between the actual-shift-ratio corresponding step number Bstep and an actual step number Δstep, i.e. displacement amount of the operated position of the step motor 27 (ΔStep=Astep−Bstep). Note that the actual step number Astep is equal to the step number Step commanded to the step motor 27, and designates an actual operated position thereof.

Figure 12:
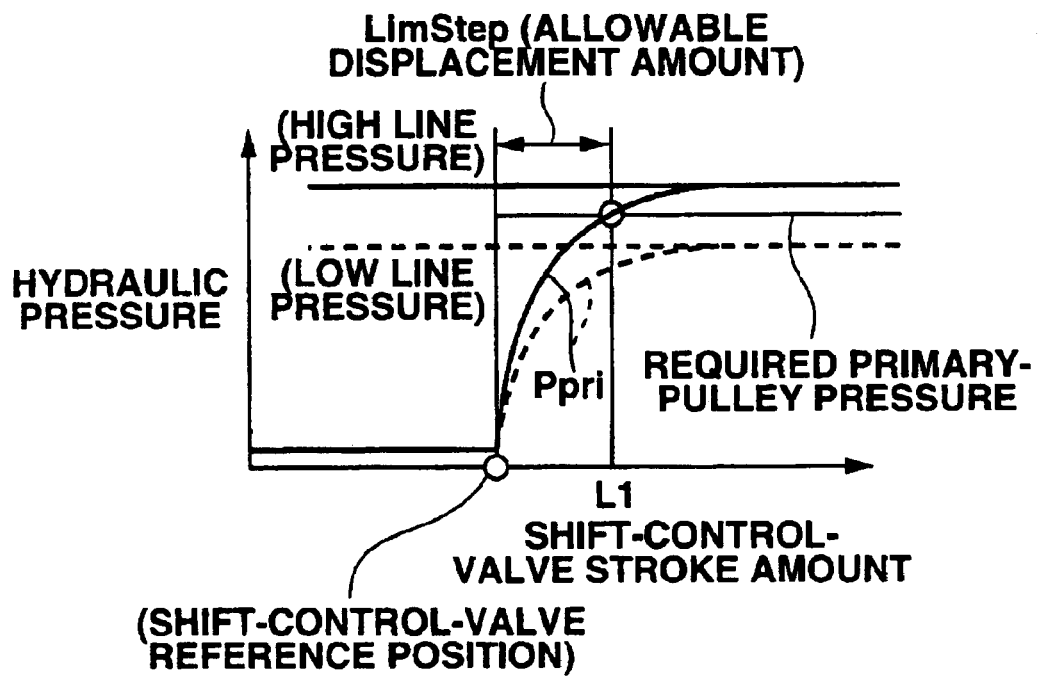
FIG. 12 is a graph similar to FIG. 11, illustrating a highest-shift-ratio unachieved phenomenon when the line pressure is deficient.

If it is determined at a step S23 that the change velocity or shift velocity of the actual shift ratio Ip is relatively low velocity less than a set value, and it is determined at a step S24 that the actual shift ratio Ip is high-side shift ratio not equal to or greater than a low-side set value, control proceeds to a step S25. At the step S25, it is integrated a value obtained by subtracting an allowable displacement amount LimStep from the step-motor operated-position displacement amount ΔStep, i.e. part of the displacement amount ΔStep exceeding the allowable displacement amount LimStep. The integral value is multiplied by a conversion gain G applied when converting the step number Step into the primary-pulley pressure Ppri, obtaining a primary-pulley pressure over/short amount or line-pressure correction amount ΔP. Referring to FIG. 12, the allowable displacement amount LimStep is determined in conjunction with the required primary-pulley pressure Ppri*. At steps S26 and S27, while restricting the line-pressure correction amount ΔP so as not to over an upper limit or under a lower limit, and restricting also the rate of change of the line-pressure correction amount ΔP with respect to time, final line-pressure correction amount ΔP is determined.

At the step S23, if it is determined that the change velocity of the actual shift ratio Ip is relatively high velocity more than the set value, control proceeds to a step S28 where the integral is stopped to hold the integral value, then control proceeds to the step S25. At the step S24, if it is determined that the actual shift ratio Ip is low-side shift ratio equal to or greater than the low-side set value, control proceeds to a step S29 where the final line-pressure correction amount ΔP is reset to zero, then control proceeds to the step S26.

FIG. 7 is a block diagram showing the control program in FIG. 6. An actual-shift-ratio corresponding step-number computing part 31 calculates the actual-shift-ratio corresponding step number Bstep from the actual shift ratio Ip through inverse conversion to that during shift control. And it is calculated the deviation ΔStep between the actual-shift-ratio corresponding step number Bstep and the actual step number Astep, i.e. displacement amount of the operated position of the step motor 27 (ΔStep=Astep−Bstep). Then, the allowable displacement amount LimStep is subtracted from the deviation ΔStep to obtain part (ΔStep−LimStep) of the step-motor operated-position displacement amount ΔStep exceeding the allowable displacement amount LimStep, which is provided to a first input of an integrator 32. The integrator 32 has a second input to which zero is provided. When the shift velocity is lower than the set value, the integrator 32 carries out integral on (ΔStep−LimStep) received through the first input, whereas when the shift velocity is equal to or higher than the set value, the integrator 32 carries out integral on zero received through the second input, holding the integral value accordingly.

A step-number/hydraulic pressure converter 33 determines line-pressure correction amount ΔP by multiplying the integral value by a conversion gain G applied when converting the step number Step into the primary-pulley pressure Ppri. A line-pressure correction-amount limiter 34 restricts line-pressure correction amount ΔP so as not to over an upper limit or under a lower limit. And a line-pressure correction-amount change-rate limiter 35 restricts the rate of change of the line-pressure correction amount ΔP with respect to time. Under such limitation, the final line-pressure correction amount ΔP is obtained. Moreover, the line-pressure correction-amount limiter 34 resets the line-pressure correction amount ΔP when the actual shift ratio Ip is low-side shift ratio is equal to or greater than the low-side set value.

After determining the line-pressure correction amount ΔP as described with reference to FIGS. 6 and 7, at a step S8 shown in FIG. 3, the primary-pulley pressure over/short amount or line-pressure correction amount ΔP is added to the target primary-pulley pressure Ppri(0) determined at the step S6, obtaining a primary-pulley-pressure command value Ppri(DSR). At a step S9, the primary-pulley-pressure command value Ppri(DSR) is compared with the required secondary-pulley pressure Psec*. If Ppri(DSR)≧Psec*, control proceeds to a step S10 where a target line pressure $P_L^*$ is set equal to the primary-pulley-pressure command value Ppri(DSR), and the drive duty corresponding to the target line pressure $P_L^*$ is output to the solenoid 23a of the pressure regulating valve 23. On the other hand, if Ppri (DSR)<Psec*, control proceeds to a step S11 where the target line pressure $P_L^*$ is set equal to the secondary-pulley pressure Psec*, and the drive duty corresponding to the target line pressure $P_L^*$ is output to the solenoid 23a of the pressure regulating valve 23.

The latter half of the block diagram in FIG. 7 shows processing carried out at the steps S8–S11 in FIG. 3. An adder 36 adds the primary-pulley pressure over/short amount or line-pressure correction amount ΔP to the target primary-pulley pressure Ppri(0), obtaining the primary-pulley-pressure command value Ppri(DSR). And a select high selecting part 37 selects the greater of the primary-pulley-pressure command value Ppri(DSR) and the secondary-pulley pressure Psec*, and sets the target line pressure $P_L^*$ equal thereto to carry out line-pressure control.

According to line-pressure control in the first embodiment, the actual-shift-ratio corresponding step number Bstep of the step motor 27 that it should be, i.e. actual-shift-ratio corresponding operated position, is calculated from the actual shift ratio Ip. And the deviation ΔStep is calculated between the actual-shift-ratio corresponding step number Bstep and the actual step number or step-motor actual operated position Astep (ΔStep=Δstep−Bstep). The line pressure $P_L$ is corrected to reduce the displacement ΔStep between the two operated positions. Note that the deviation ΔStep corresponds to the line-pressure over/short amount. Thus, according to line-pressure control for correcting the line pressure $P_L$ to reduce the deviation ΔStep, the line pressure $P_L$ can be corrected before having the highest-shift-ratio unachieved state, i.e. as soon as an excess or a shortage of the line pressure $P_L$ occurs, not only when the line pressure $P_L$ is short, but also when it is excessive, resulting in quick removal of delay of achieving the target shift ratio due to excess or shortage of the line pressure $P_L$.

Further, when correcting the line pressure $P_L$ to reduce the displacement ΔStep between the two operated positions, an integral value of the displacement ΔStep is obtained, and the line pressure $P_L$ is corrected to reduce the integral value. That is, line-pressure correction is carried out in accordance with the integral value of the displacement ΔStep, allowing enhancement in line-pressure correction accuracy. Moreover, since the integral is carried out about part (ΔStep−LimStep) of the step-motor operated-position displacement amount ΔStep exceeding the allowable displacement amount LimStep, only this part is provided for line-pressure correction, achieving line-pressure correction in such a way as to converge the displacement ΔStep to the allowable displacement amount LimStep, allowing minimum line-pressure correction, resulting in removal of needless control.

Still further, at the step S23 in FIG. 6, if it is determined that the change velocity of the actual shift ratio Ip is greater than the set value, the just previous integral value is held at the step S28. This precludes fulfillment of correction of the line pressure $P_L$ in accordance with the displacement ΔStep between the two operated positions which occurs when the shift velocity is higher, allowing enhancement in control accuracy. And at the step S24 in FIG. 6, if it is determined that the actual shift ratio is low-side shift ratio equal or greater than the set value, the line-pressure correction amount ΔP is reset to zero. That is, during low-side shift ratio where an excess or a shortage of the line pressure $P_L$ presents little problem, the line-pressure correction amount ΔP is reset to restart line-pressure correction control, allowing avoiding of an inconvenience that line-pressure control is carried out continuously in accordance with the previous integral value even though an irregularity of the line pressure $P_L$ is removed.

Furthermore, an upper limit and a lower limit are set for the line-pressure correction amount ΔP at the step S26, and for the rate of change of the line-pressure correction amount ΔP with respect to time at the step S27, allowing prevention of occurrence of a shock due to abrupt change in primary-pulley pressure or secondary-pulley pressure caused by an increase in line-pressure correction amount ΔP and/or rate of change thereof.

Figure 8:
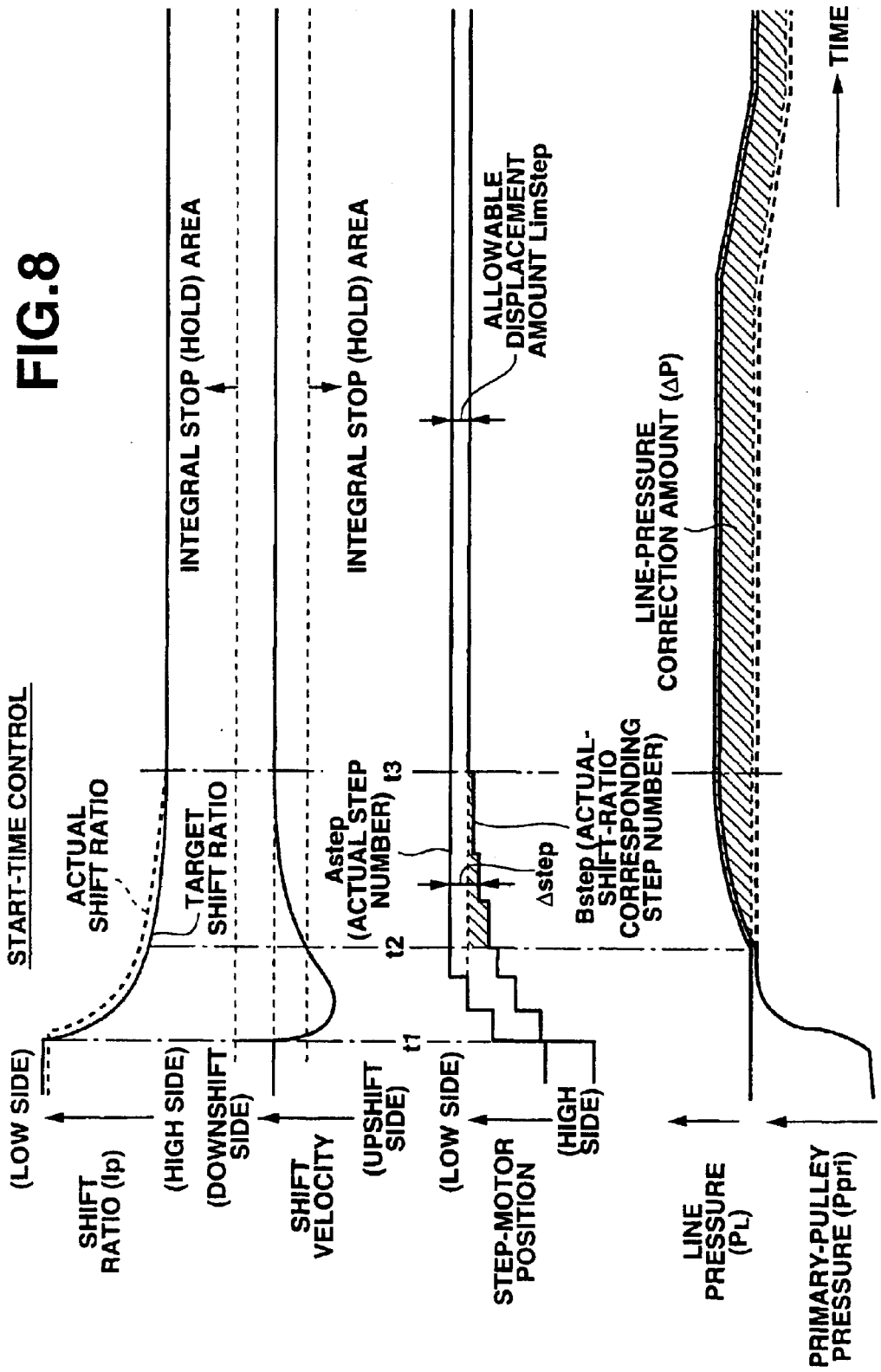
FIG. 8 is a time chart showing line-pressure control in the first embodiment.

Referring to FIG. 8 which shows operation at start time, line-pressure control in the first embodiment is described. During a period from start time of an instant t1 to an instant t2, the shift velocity is higher, and thus the integral is stopped, having no start of line-pressure control. Line-pressure control is started after the instant t2. At the instant t2, the deviation ΔStep between the actual step number Astep and the actual-shift-ratio corresponding step number Bstep exceeds the allowable displacement amount LimStep, the integral is carried out about the hatched exceeding part. Using the conversion gain G, the integral value is converted into the line-pressure correction amount ΔP, correcting upward the line pressure $P_L$ accordingly. This correction converges the deviation ΔStep between the actual step number Astep and the actual-shift-ratio corresponding step number Bstep to the allowable displacement amount LimStep. Thereafter, the line-pressure correction amount ΔP is maintained to allow the deviation ΔStep to fall within the allowable displacement amount LimStep.

Figure 9:
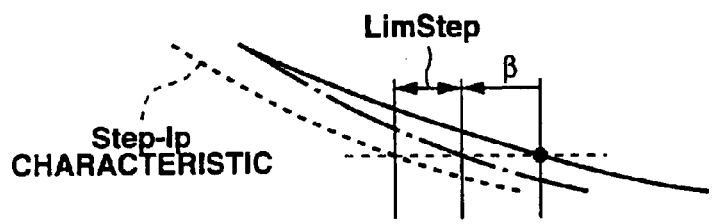
FIG. 9 is a characteristic diagram for explaining an effect of line-pressure control in the first embodiment.
Figure 10:
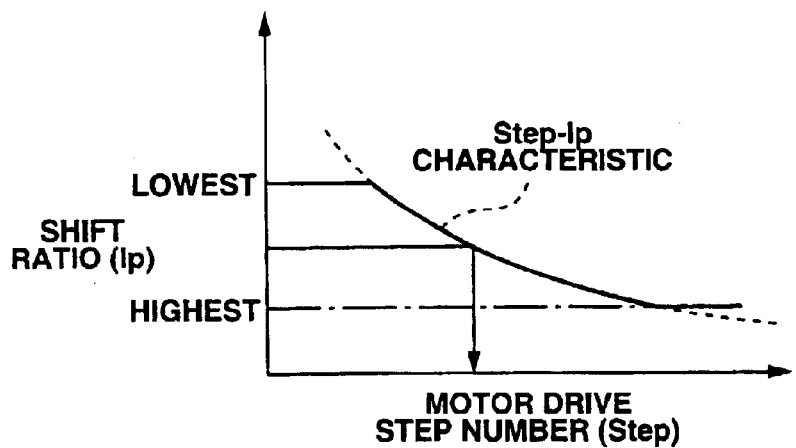
FIG. 10 is a graph similar to FIG. 5, illustrating a characteristic of step number of a step motor vs. shift ratio when the line pressure is normal.
Figure 11:
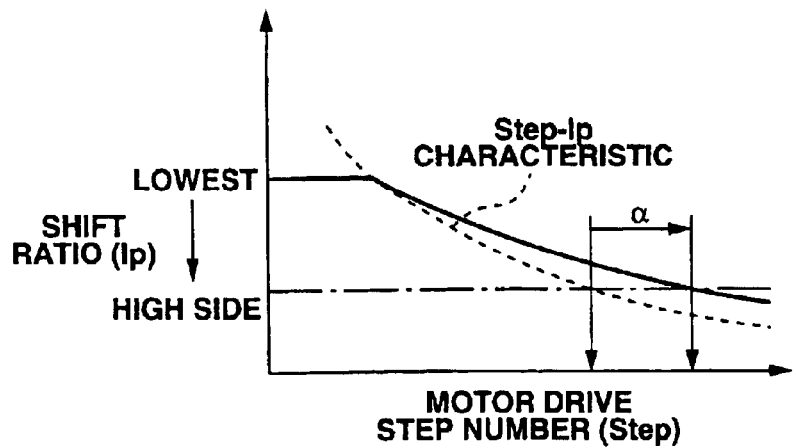
FIG. 11 is a graph similar to FIG. 10, illustrating a characteristic of step number of the step motor vs. shift ratio when the line pressure is deficient.

Referring to FIG. 9, a further description is made about the above line-pressure control. Referring to FIG. 9, broken line and solid line correspond to those in FIG. 11, whereas one-dot chain line shows a characteristic when the displacement amount with respect to the theoretical Step-Ip characteristic shown by broken line is equal to the allowable displacement amount LimStep. According to the first embodiment, even when the Step-Ip characteristic is displaced from a curve shown by broken line to a curve shown by solid line due to shortage of the line pressure $P_L$, upward correction of the line pressure $P_L$ can converge the Step-Ip characteristic from the curve shown by solid line to the curve shown by one-dot chain line, achieving the target shift ratio by a small excess of the step number Step as shown by β with respect to the same target shift ratio.

Figure 13:
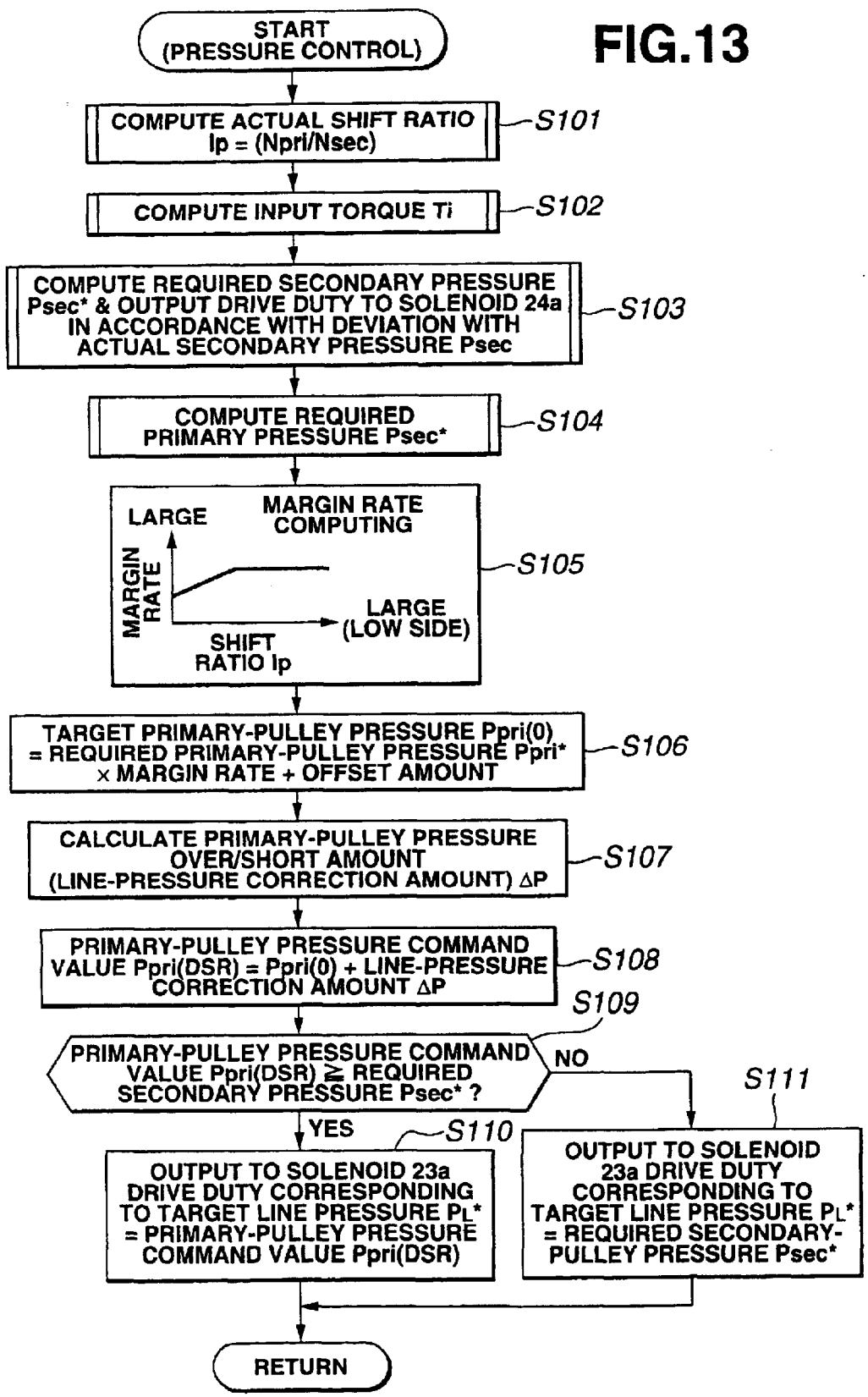
FIG. 13 is a chart similar to FIG. 6, showing a second embodiment of the present invention.

Referring to FIG. 13, there is shown second embodiment of the present invention which is substantially the same in structure as the first embodiment described with reference to FIGS. 1 and 2.

Figure 14:
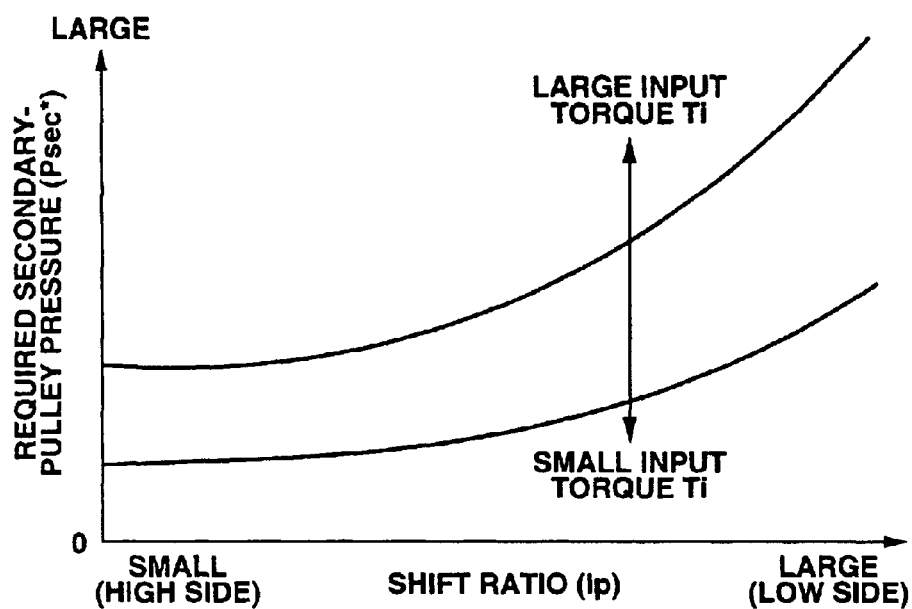
FIG. 14 is a graph similar to FIG. 12, illustrating a characteristic of shift ratio vs. required secondary-pulley pressure.

Referring to FIG. 13, the pressure control part 12a is described, which repeatedly executes control as shown in FIG. 13 by carrying out a periodic interrupt. First, at a step S101, the primary-pulley rotational speed Npri is divided by the secondary-pulley rotational speed Nsec to determine actual shift ratio Ip. At a step S102, transmission input torque Ti is calculated in accordance with input-torque information such as engine speed and fuel injection time derived from the engine ECU 19. At a step S103, required secondary-pulley pressure Psec* is determined from the actual shift ratio Ip and the input torque Ti in accordance with a map as shown in FIG. 14. By feedback control in accordance with a deviation between the actual secondary-pulley pressure Psec sensed by the sensor 15 and the required secondary-pulley pressure Psec*, the drive duty of the pressure reducing valve 24 is determined to make the actual secondary-pulley pressure Psec coincide with the required secondary-pulley pressure Psec*, which is provided to the solenoid 24a.

Figure 15:
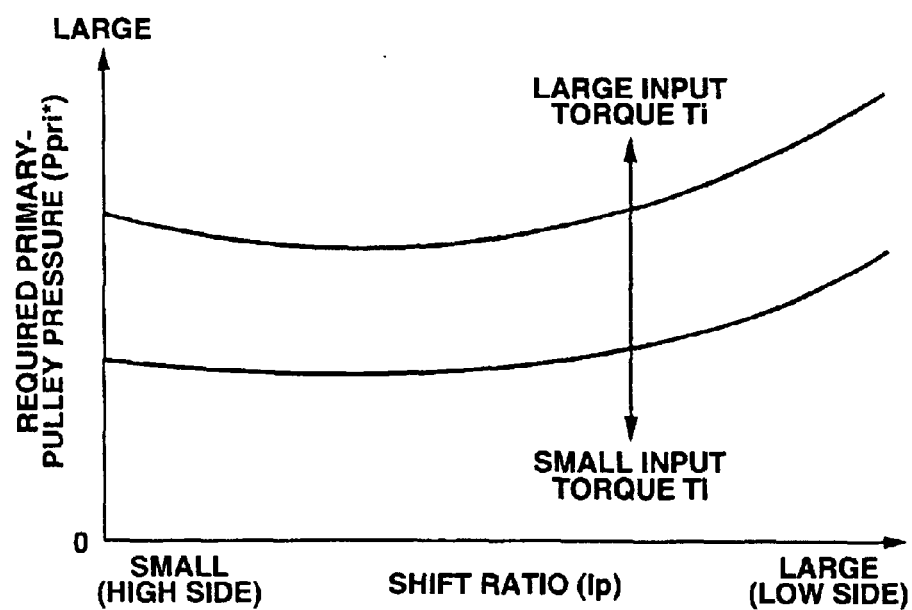
FIG. 15 is a graph similar to FIG. 14, illustrating a characteristic of shift ratio vs. required primary-pulley pressure.

Line-pressure control at a step S104 and subsequent is described, which features the present invention. At the step S104, required primary-pulley pressure Ppri* is determined from the actual shift ratio Ip and the input torque Ti in accordance with a map as shown in FIG. 15. At a step S105, it is determined from the actual shift ratio Ip in accordance with a given map a margin rate to be given to the primary-pulley pressure Ppri considering a pressure loss at the shift control valve 25. At a step S106, the required primary-pulley pressure Ppri* is multiplied by the margin rate, to which an offset amount or safety part is added, thus determining target primary-pulley pressure Ppri(0).

Figure 16:
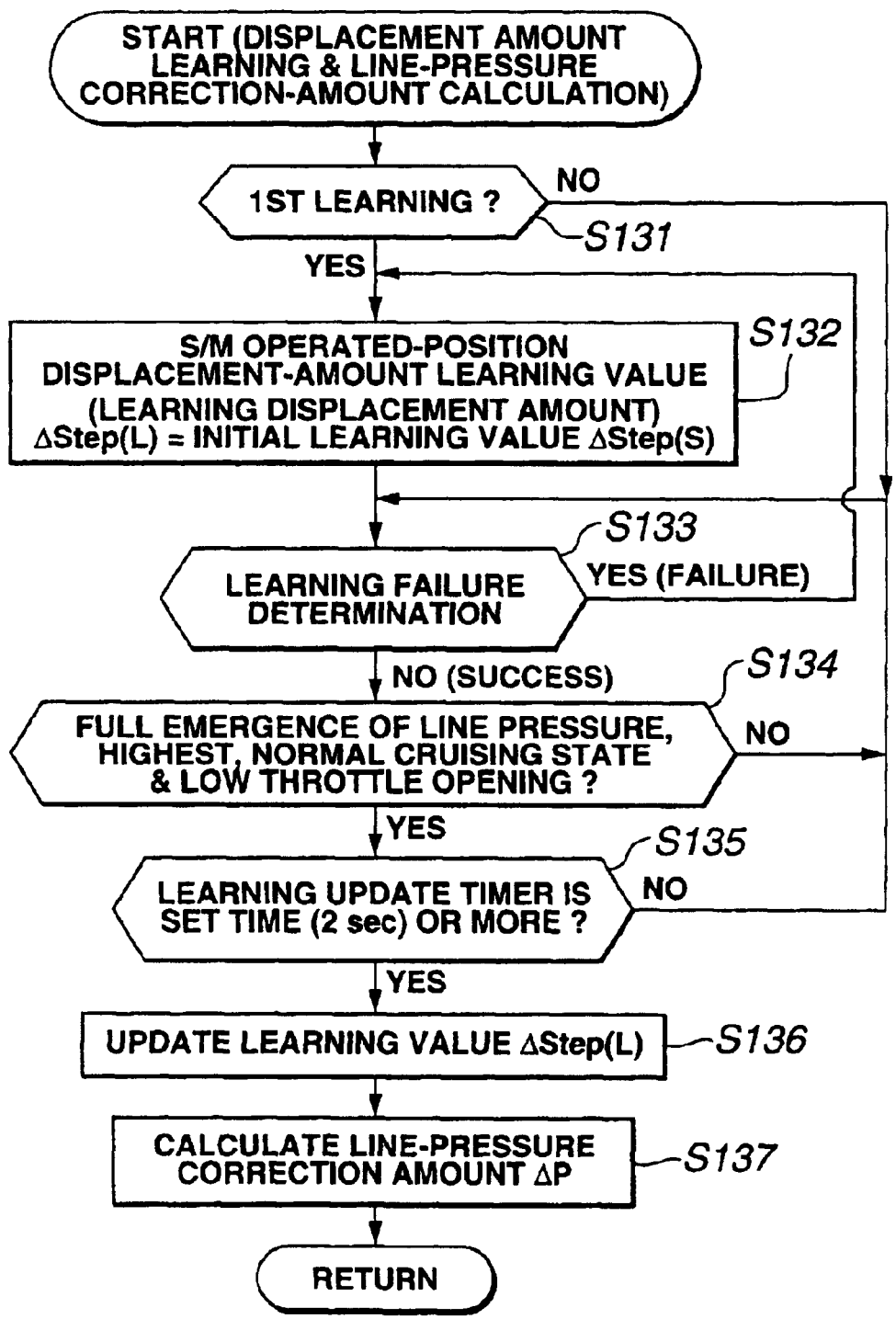
FIG. 16 is a chart similar to FIG. 13, showing operation of the second embodiment.
Figure 17:
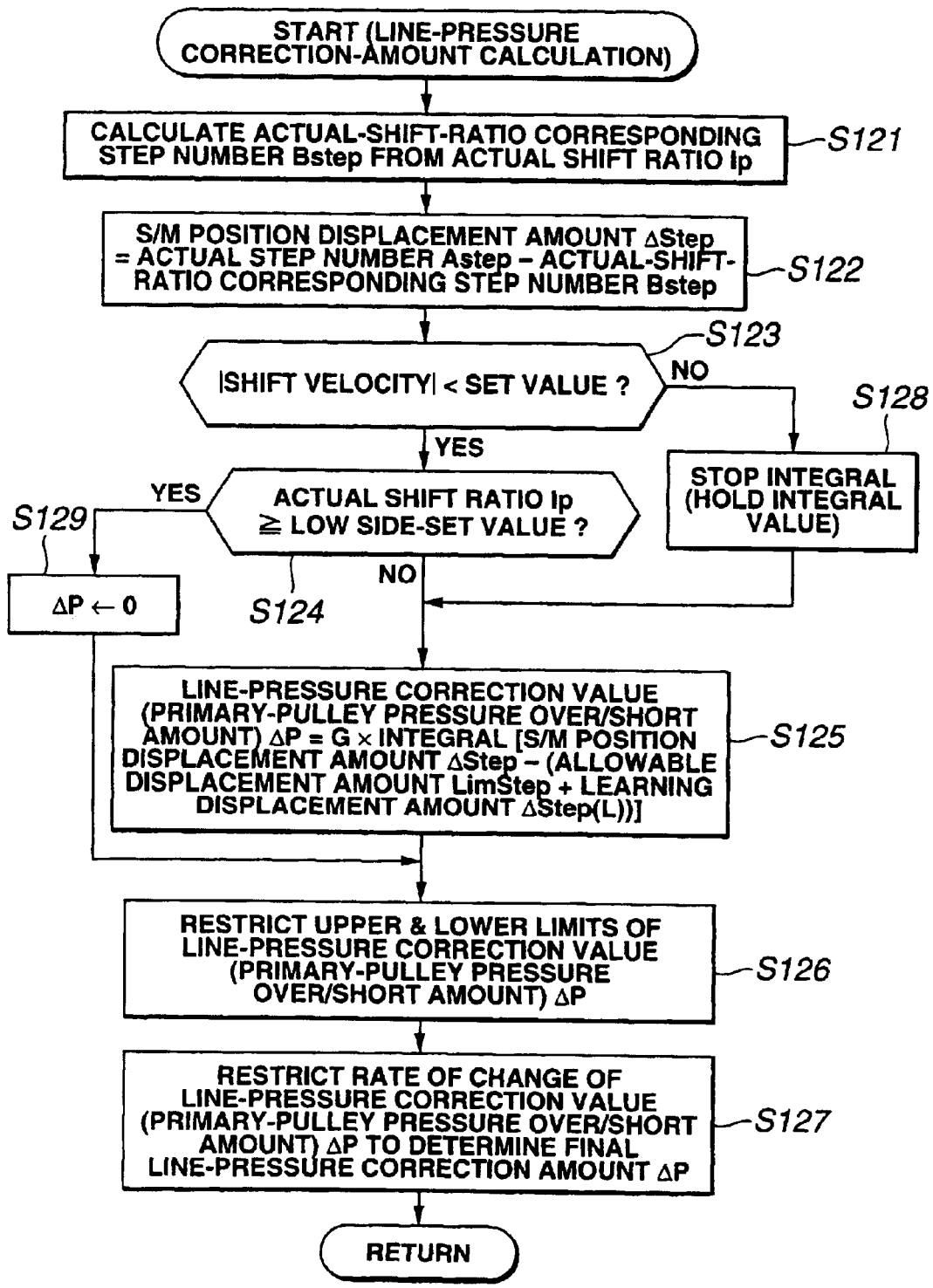
FIG. 17 is a chart similar to FIG. 16, showing operation of the second embodiment.
Figure 21:
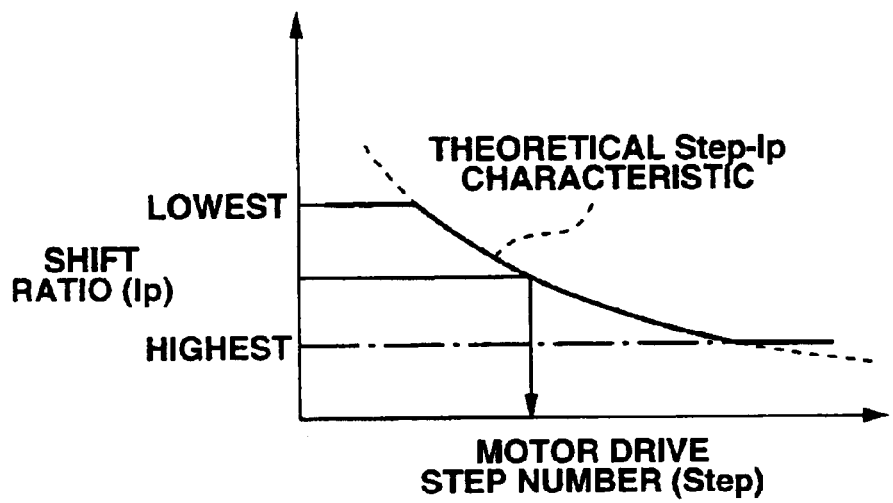
FIG. 21 is a graph similar to FIG. 15, illustrating a characteristic of step number of the step motor vs. shift ratio when the line pressure is normal, and the step motor has no mounting error.
Figure 22:
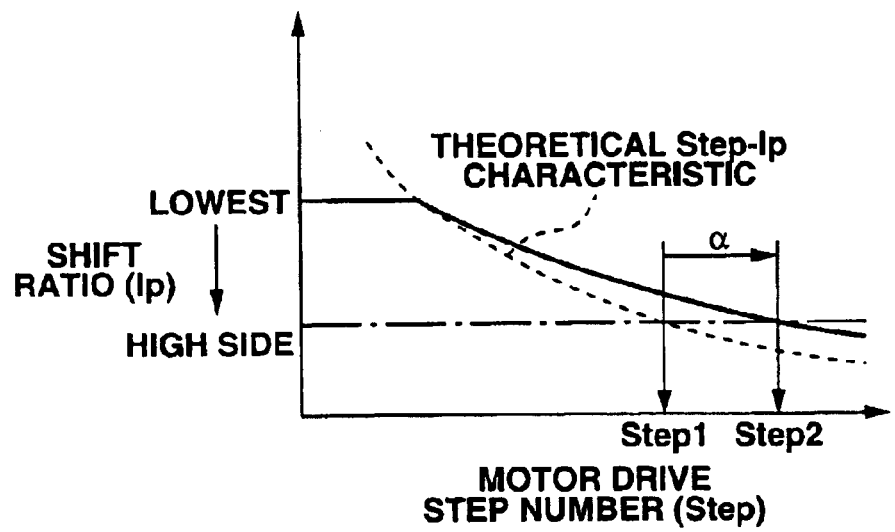
FIG. 22 is a graph similar to FIG. 21, illustrating a characteristic of step number of the step motor vs. shift ratio when the line pressure is deficient.

At a step S107, referring to FIGS. 16 and 17, primary-pulley pressure over/short amount or line-pressure correction amount ΔP is calculated as shown in FIGS. 16 and 17. FIG. 16 shows learning processing on the step-motor operated-position displacement amount ΔStep between the actual step number Δstep and the actual-shift-ratio corresponding step number Bstep, which is to be carried out prior to calculation of the primary-pulley pressure over/short amount ΔP. First, at a step S131, it is determined whether or not first learning processing is carried out. If it is determined that first learning processing is carried out, control proceeds to a step S132 where a learning value or learning displacement amount ΔStep(L) of the step-motor operated-position or step-number displacement amount ΔStep is set at an initial learning value ΔStep(S) which allows full increase in the line pressure $P_L$, then control proceeds to a step S133. At commencement of the learning, the initial value ΔStep(S) of the learning displacement amount ΔStep(L) and its polarity are set to achieve the line pressure $P_L$ required to make the relationship between the step number Step of the step motor 27 and the shift ratio Ip correspond to the theoretical Step-Ip characteristic as shown in FIG. 21. On the other hand, if the answer at the step S131 is NO, control proceeds to a step 133 skipping the step S132.

At the step S133, it is determined whether or not the learning ends in failure or achieves success. Concerning this determination, when the learning displacement amount ΔStep(L) is not equal to the initial learning value ΔStep(S), i.e. the learning is finished, that the vehicle is in the normal cruising state where the shift velocity is smaller than a minute set value, and that an absolute value of the step-motor operated-position displacement amount ΔStep, i.e. step-motor control deviation, is equal to or greater than a set value, i.e. the state of having greater step-motor control deviation (which means occurrence of control hunting) is continued, for example, for 2 sec even though the learning is finished to provide normal cruising, it is determined that the learning ends in failure. If the learning ends in failure, control is returned to the step S132 so as to redo the learning, whereas if the learning achieves success, it is determined at steps S134 and S135 whether or not the learning conditions are met.

At the step S134, it is determined whether or not the line pressure $P_L$ is fully provided through processing at the step S132, the shift ratio is in the highest-shift-ratio selected state, the vehicle is in the normal cruising state in accordance with the fact that no variation occurs in the actual step number Δstep of the step motor 27 or the actual shift ratio Ip corresponds roughly to a target shift ratio, and that a throttle opening TVO is low. And at the step S135, it is determined whether or not the state at the step S134 is continued for a set time, e.g. 2 sec. If the answers at the steps S134 and S135 are YES, control proceeds to a step S136 where the learning is carried out about the step-motor operated-position displacement amount ΔStep to update this displacement amount ΔStep or the learning displacement amount ΔStep(L).

On the other hand, if the answer at the step S134 or S135 is NO, control is returned to the step S133 to carry out recheck the learning conditions. At a step S137, using as a factor the learning displacement amount ΔStep(L) obtained at the step S136, a line-pressure correction amount ΔP is determined through processing described below with reference to FIG. 17.

Referring to FIG. 17, at a step S121, the step number Step of the step motor 27 that it should be at the actual shift ratio Ip, i.e. actual-shift-ratio corresponding step number Bstep or actual-shift-ratio corresponding operated position of the step motor 27, is calculated from the actual shift ratio Ip through inverse conversion to that during shift control. At a step S122, it is calculated the deviation ΔStep between the actual-shift-ratio corresponding step number Bstep and the actual step number Astep, i.e. displacement amount of the operated position of the step motor 27 (ΔStep=Astep−Bstep). Note that the actual step number Δstep is equal to the step number Step commanded to the step motor 27, and designates an actual operated position thereof.

If it is determined at a step S123 that the change velocity or shift velocity of the actual shift ratio Ip is relatively low velocity less than a set value, and it is determined at a step S124 that the actual shift ratio Ip is high-side shift ratio not equal to or greater than a low-side set value, control proceeds to a step S125. At the step S125, it is integrated a value obtained by subtracting the sum of an allowable displacement amount LimStep and the learning displacement amount ΔStep(L) updated at the step S136 from the step-motor operated-position displacement amount ΔStep, i.e. part of the displacement amount ΔStep exceeding the sum of the allowable displacement amount LimStep and the learning displacement amount ΔStep(L). The integral value is multiplied by a conversion gain G applied when converting the step number Step into the primary-pulley pressure Ppri, obtaining a primary-pulley pressure over/short amount or line-pressure correction amount ΔP.

At steps S126 and S127, while restricting the line-pressure correction amount ΔP so as not to over an upper limit or under a lower limit, and restricting also the rate of change of the line-pressure correction amount ΔP with respect to time, final line-pressure correction amount ΔP is determined.

At the step S123, if it is determined that the change velocity of the actual shift ratio Ip is relatively high velocity more than the set value, control proceeds to a step S128 where the integral is stopped to hold the integral value, then control proceeds to the step S125. At the step S124, if it is determined that the actual shift ratio Ip is low-side shift ratio equal to or greater than the low-side set value, control proceeds to a step S129 where the final line-pressure correction amount ΔP is reset to zero, then control proceeds to the step S126.

Figure 18:
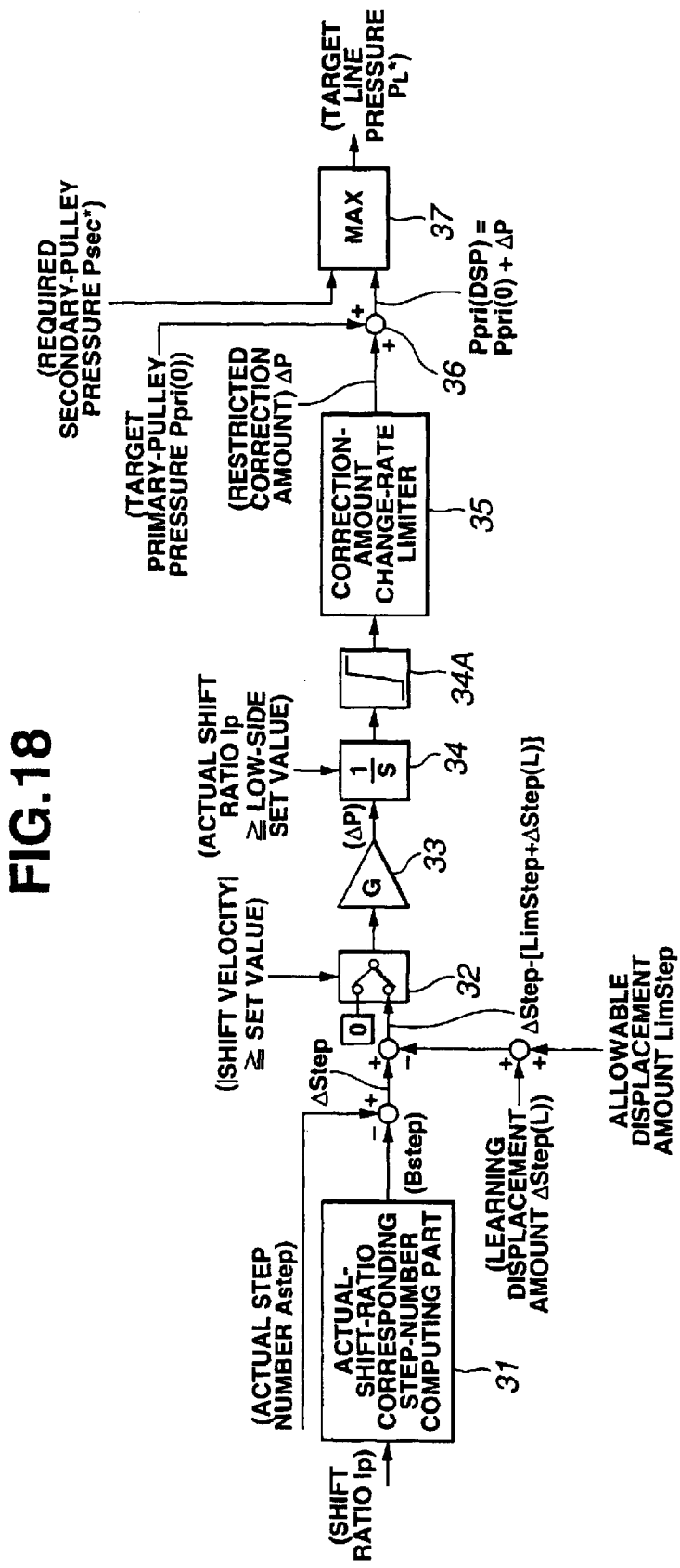
FIG. 18 is a diagram similar to FIG. 7, showing arithmetic processing of the line-pressure correction amount.

FIG. 18 is a block diagram showing the control program in FIG. 17. An actual-shift-ratio corresponding step-number computing part 31 calculates the actual-shift-ratio corresponding step number Bstep from the actual shift ratio Ip through inverse conversion to that during shift control. And it is calculated the deviation ΔStep between the actual-shift-ratio corresponding step number Bstep and the actual step number Astep, i.e. displacement amount of the operated position of the step motor 27 (ΔStep=Astep−Bstep). Then, the sum of the allowable displacement amount LimStep and the learning displacement amount ΔStep(L) is subtracted from the deviation ΔStep to obtain part (ΔStep−LimStep−ΔStep(L)) of the step-motor operated-position displacement amount ΔStep exceeding the sum of the allowable displacement amount LimStep and the learning displacement amount ΔStep(L), which is provided to a first input of an integrator 32. The integrator 32 has a second input to which zero is provided. When the shift velocity is lower than the set value, the integrator 32 carries out integral on (ΔStep−LimStep−ΔStep(L)) received through the first input, whereas when the shift velocity is equal to or higher than the set value, the integrator 32 carries out integral on zero received through the second input, holding the integral value accordingly.

A step-number/hydraulic pressure converter 33 determines line-pressure correction amount ΔP by multiplying the integral value by a conversion gain G applied when converting the step number Step into the primary-pulley pressure Ppri. A line-pressure resetter 34 resets the line-pressure correction amount ΔP when the actual shift ratio Ip is low-side shift ratio is equal to or greater than the low-side set value. A line-pressure correction-amount limiter 34A restricts line-pressure correction amount ΔP so as not to over an upper limit or under a lower limit. And a line-pressure correction-amount change-rate limiter 35 restricts the rate of change of the line-pressure correction amount ΔP with respect to time. Under such limitation, the final line-pressure correction amount ΔP is obtained.

After determining the line-pressure correction amount ΔP as described with reference to FIGS. 16 and 17, at a step S108 shown in FIG. 13, the primary-pulley pressure over/short amount or line-pressure correction amount ΔP is added to the target primary-pulley pressure Ppri(0) determined at the step S106, obtaining a primary-pulley-pressure command value Ppri(DSR). At a step S109, the primary-pulley-pressure command value Ppri(DSR) is compared with the required secondary-pulley pressure Psec*. If Ppri(DSR) ≧Psec*, control proceeds to a step S110 where a target line pressure $P_L$* is set equal to the primary-pulley-pressure command value Ppri(DSR), and the drive duty corresponding to the target line pressure $P_L$* is output to the solenoid 23a of the pressure regulating valve 23. On the other hand, if Ppri(DSR)<Psec*, control proceeds to a step S111 where the target line pressure $P_L^*$ is set equal to the secondary-pulley pressure Psec*, and the drive duty corresponding to the target line pressure $P_L^*$ is output to the solenoid 23a of the pressure regulating valve 23.

The latter half of the block diagram in FIG. 18 shows processing carried out at the steps S108–S111 in FIG. 13. An adder 36 adds the primary-pulley pressure over/short amount or line-pressure correction amount ΔP to the target primary-pulley pressure Ppri(0), obtaining the primary-pulley-pressure command value Ppri(DSR). And a select high selecting part 37 selects the greater of the primary-pulley-pressure command value Ppri(DSR) and the secondary-pulley pressure Psec*, and sets the target line pressure $P_L^*$ equal thereto to carry out line-pressure control.

According to line-pressure control in the second embodiment, the actual-shift-ratio corresponding step number Bstep of the step motor 27 that it should be, i.e. actual-shift-ratio corresponding operated position, is calculated from the actual shift ratio Ip. And the deviation ΔStep is calculated between the actual-shift-ratio corresponding step number Bstep and the actual step number or step-motor actual operated position Astep (ΔStep=Astep−Bstep). It is integrated a value (ΔStep−LimStep−ΔStep(L)) obtained by subtracting the sum of the allowable displacement amount LimStep and the learning displacement amount ΔStep(L) from the deviation ΔStep. The line pressure $P_L$ is corrected to reduce the integral value, i.e. to reduce the deviation or step-motor operated-position displacement amount ΔStep in such a way as to converge to the allowable displacement amount LimStep. Note that the deviation ΔStep corresponds to the line-pressure over/short amount. Thus, according to line-pressure control for correcting the line pressure $P_L$ to reduce the deviation ΔStep, the line pressure $P_L$ can be corrected before having the highest-shift-ratio unachieved state, i.e. as soon as an excess or a shortage of the line pressure $P_L$ occurs, not only when the line pressure $P_L$ is short, but also when it is excessive, allowing correction of the line pressure $P_L$ in such a way as to converge the step-motor operated-position displacement amount ΔStep to the allowable displacement amount LimStep, resulting in a quick removal of delay of achieving the target shift ratio due to excess or shortage of the line pressure $P_L$.

Further, when correcting the line pressure $P_L$ to reduce the step-motor operated-position displacement amount ΔStep, the line pressure $P_L$ is corrected to reduce the above integral value. That is, line-pressure correction is carried out in accordance with the integral value of the displacement amount ΔStep, allowing enhancement in line-pressure correction accuracy.

Still further, at the step S123 in FIG. 17, if it is determined that the change velocity of the actual shift ratio Ip is greater than the set value, the just previous integral value is held at the step S128. This precludes fulfillment of correction of the line pressure $P_L$ in accordance with the step-motor operated-position displacement amount ΔStep which occurs when the shift velocity is higher, allowing enhancement in control accuracy. And at the step S124 in FIG. 17, if it is determined that the actual shift ratio is low-side shift ratio equal or greater than the set value, the line-pressure correction amount ΔP is reset to zero. That is, during low-side shift ratio where an excess or a shortage of the line pressure $P_L$ presents little problem, the line-pressure correction amount ΔP is reset to restart line-pressure correction control, allowing avoiding of an inconvenience that line-pressure control is carried out continuously in accordance with the previous integral value even though an irregularity of the line pressure $P_L$ is removed.

Furthermore, an upper limit and a lower limit are set for the line-pressure correction amount ΔP at the step S126, and for the rate of change of the line-pressure correction amount ΔP with respect to time at the step S127, allowing prevention of occurrence of a shock due to abrupt change in primary-pulley pressure or secondary-pulley pressure caused by an increase in line-pressure correction amount ΔP and/or rate of change thereof.

In the second embodiment, when carrying out line-pressure correction, it is integrated a value (ΔStep−LimStep−ΔStep(L)) obtained by subtracting from the step-motor operated-position displacement amount ΔStep a value (LimStep+ΔStep(L)) obtained by increasing the allowable displacement amount LimStep by the learning displacement amount ΔStep(L), and not a value obtained by subtracting the allowable displacement amount LimStep from the displacement amount ΔStep. And the line pressure $P_L$ is corrected to reduce the integral value. Thus, concerning the learning displacement amount ΔStep(L) expressing the displacement amount of the actual Step-Ip characteristic due to mounting error of the step motor 27 and the like, a value after canceling the displacement amount of the actual Step-Ip characteristic is integrated and provided for line-pressure correction. As a result, the displacement amount of the actual Step-Ip characteristic can be eliminated, leading to correction of the line pressure $P_L$ in such a way as to converge the step-motor operated-position displacement amount ΔStep to the allowable displacement amount LimStep without being affected by the displacement amount of the actual Step-Ip characteristic.

Figure 23:
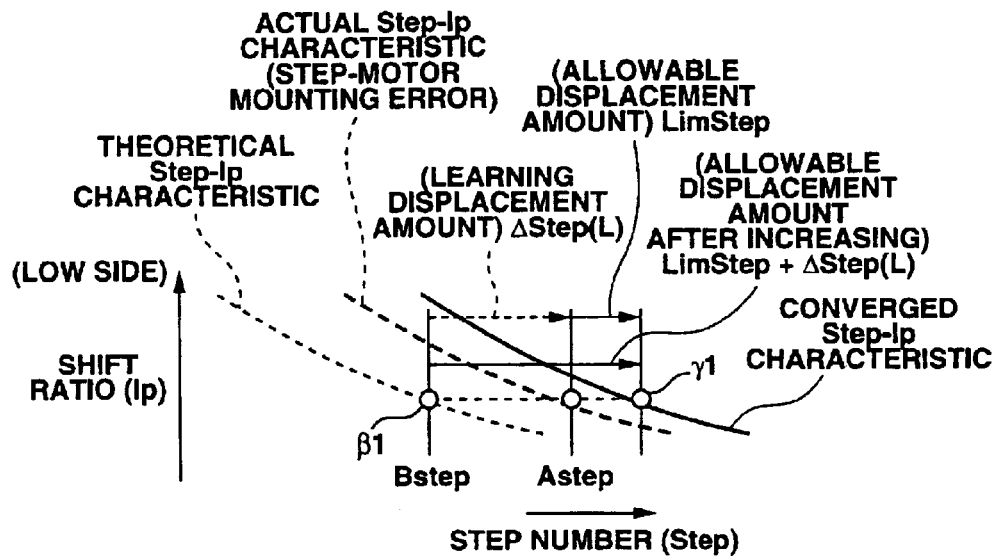
FIG. 23 is a diagram similar to FIG. 9, showing a characteristic of step number of the step motor vs. shift ratio when the step motor has a mounting error.
Figure 25:
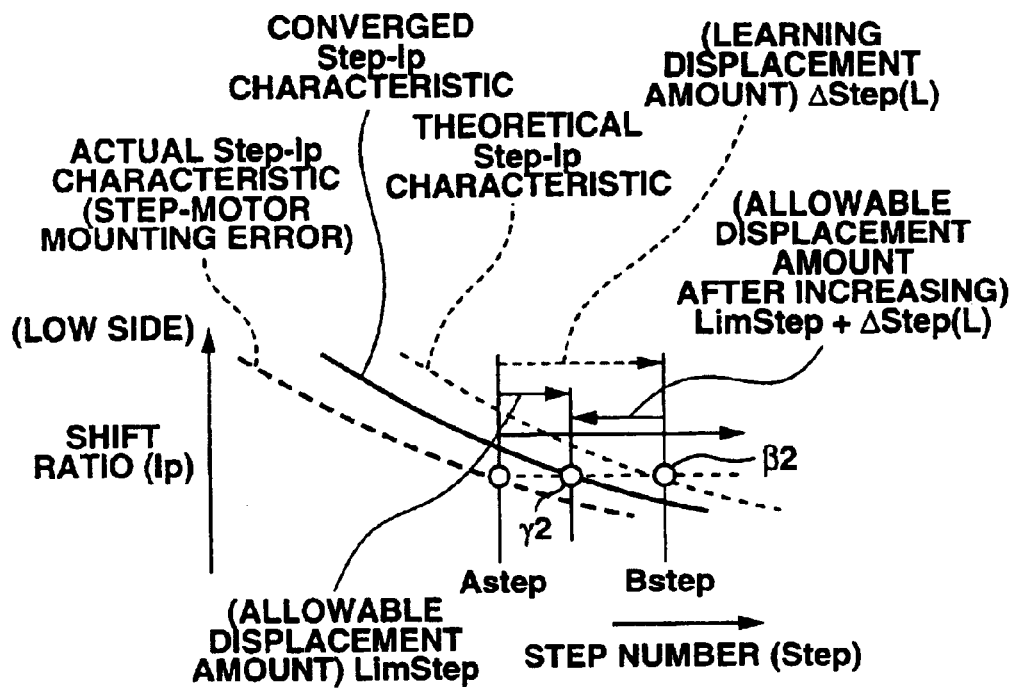
FIG. 25 is a diagram similar to FIG. 23, showing a characteristic of step number of the step motor vs. shift ratio when the step motor has a mounting error in the direction opposite to that in FIG. 23.

Referring to FIGS. 23 and 25, a further description is made about the case where the actual Step-Ip characteristic is displaced in the step advancing direction (FIG. 23) or in the step delaying direction (FIG. 25) as shown by bold broken line with respect to the theoretical Step-Ip characteristic as shown by fine broken line due to mounting error of the step motor 27. As shown in FIGS. 23 and 25, the value (LimStep+ΔStep(L)) after increasing the allowable displacement amount LimStep by the learning displacement amount ΔStep(L) corresponds to the step number Step between a point β1, β2 on the theoretical Step-Ip characteristic and a point γ1, γ2 on the converged Step-Ip characteristic when using the displaced Step-Ip characteristic as reference, avoiding displacement of the step number Step between the theoretical and actual Step-Ip characteristics from being involved therein.

In the second embodiment, it is integrated a value (ΔStep−LimStep−ΔStep(L)) obtained by subtracting from the step-motor operated-position displacement amount ΔStep a value (LimStep+ΔStep(L)) obtained by increasing the allowable displacement amount LimStep by the learning displacement amount ΔStep(L). And the line pressure $P_L$ is corrected to reduce the integral value. Therefore, needless correction of the line pressure $P_L$ is prevented from occurring by erroneously determining that displacement of the actual Step-Ip characteristic due to mounting error of the step motor 27 and the like is caused by an excess or a shortage of the line pressure $P_L$. And only when the step-motor operated-position displacement amount ΔStep exceeding the allowable displacement amount LimStep occurs by an excess or a shortage of the line pressure $P_L$, the line pressure $P_L$ can be corrected in such a way as to converge the displacement amount ΔStep to the allowable displacement amount LimStep as described above.

Figure 24:
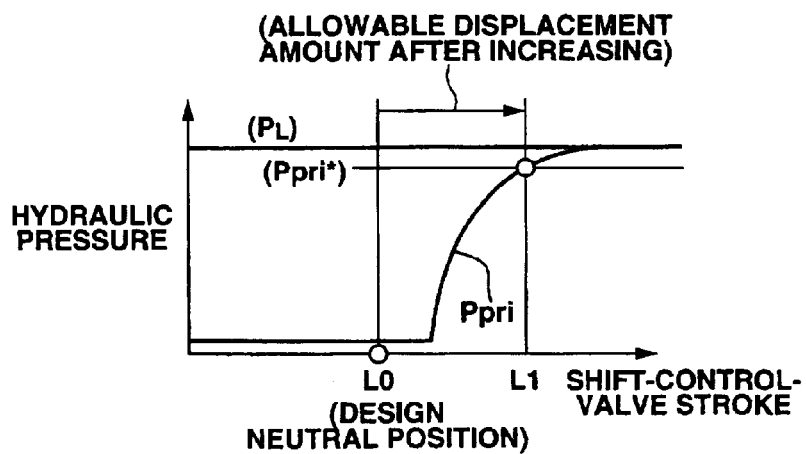
FIG. 24 is a graph similar to FIG. 12, illustrating a characteristic of stroke of a shift control valve vs. primary-pulley pressure when the step motor has a mounting error.
Figure 26:
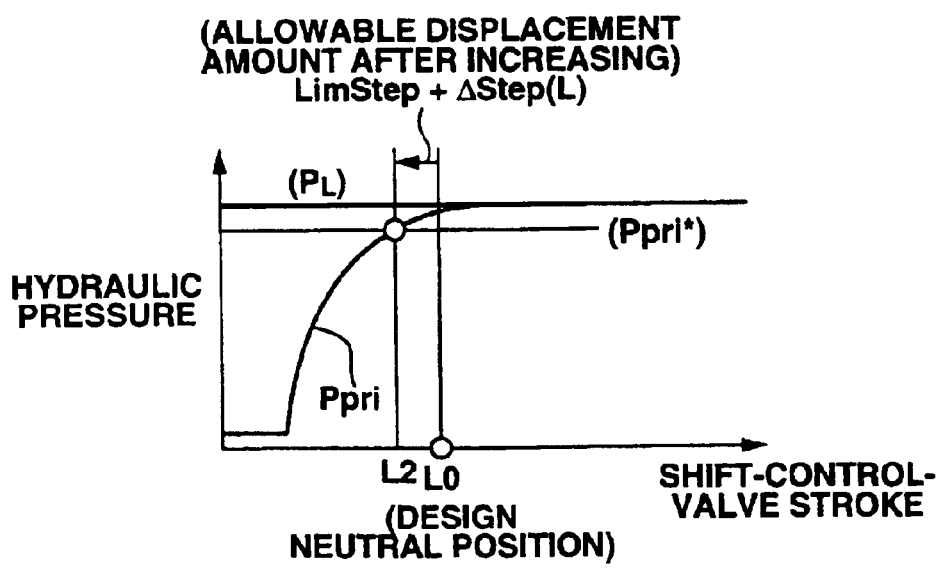
FIG. 26 is a graph similar to FIG. 24, illustrating a characteristic of stroke of the shift control valve vs. primary-pulley pressure when the step motor has a mounting error as shown in FIG. 25.

As a result, referring to FIGS. 24 and 26 which show the relationship between the stroke of the shift control valve 25 and the line pressure $P_L$ and primary-pulley pressure Ppri when the actual Step-Ip characteristic is displaced due to mounting error of the step motor 27 and the like as shown in FIGS. 23 and 25, even if stroke positions L1, L2 corresponding to the required primary-pulley pressure Ppri* differ from a stroke position or design neutral position L0 of the shift control valve 25, the line pressure $P_L$ is maintained at the same value, allowing prevention of needless correction of the line pressure $P_L$ when the actual Step-Ip characteristic is displaced due to mounting error of the step motor and the like, resulting in avoiding of occurrence of the degradation of fuel consumption due to excess of the line pressure $P_L$ and/or the target-shift-ratio unachieved state due to shortage thereof as a consequence of the needless line-pressure correction.

In the second embodiment, at the step S132 in FIG. 16, the initial value ΔStep(S) of the learning displacement amount ΔStep(L) at commencement of the learning is set to achieve the line pressure $P_L$ required to make the Step-Ip characteristic correspond to the theoretical Step-Ip characteristic. Thus, the learning is carried out with no displacement due to shortage of the line pressure $P_L$ being produced with respect to the theoretical Step-Ip characteristic. And it can be determined that displacement of the Step-Ip characteristic is due to mounting error of the step motor 27 and the like. Therefore, the learning displacement amount ΔStep(L) corresponds to the displacement amount ΔStep due to mounting error of the step motor 27 and the like, resulting in surer achievement of the above effect and operation.

Moreover, the learning is carried out when the actual shift ratio is the highest shift ratio or the vehicle is in the normal cruising state having no variation in the target shift ratio at the step S134, or when the stable shift state including those conditions is continued during a set time at the step S135, allowing enhancement in detection accuracy of the learning displacement amount ΔStep(L), resulting in surer achievement of the above effect and operation.

Figure 19:
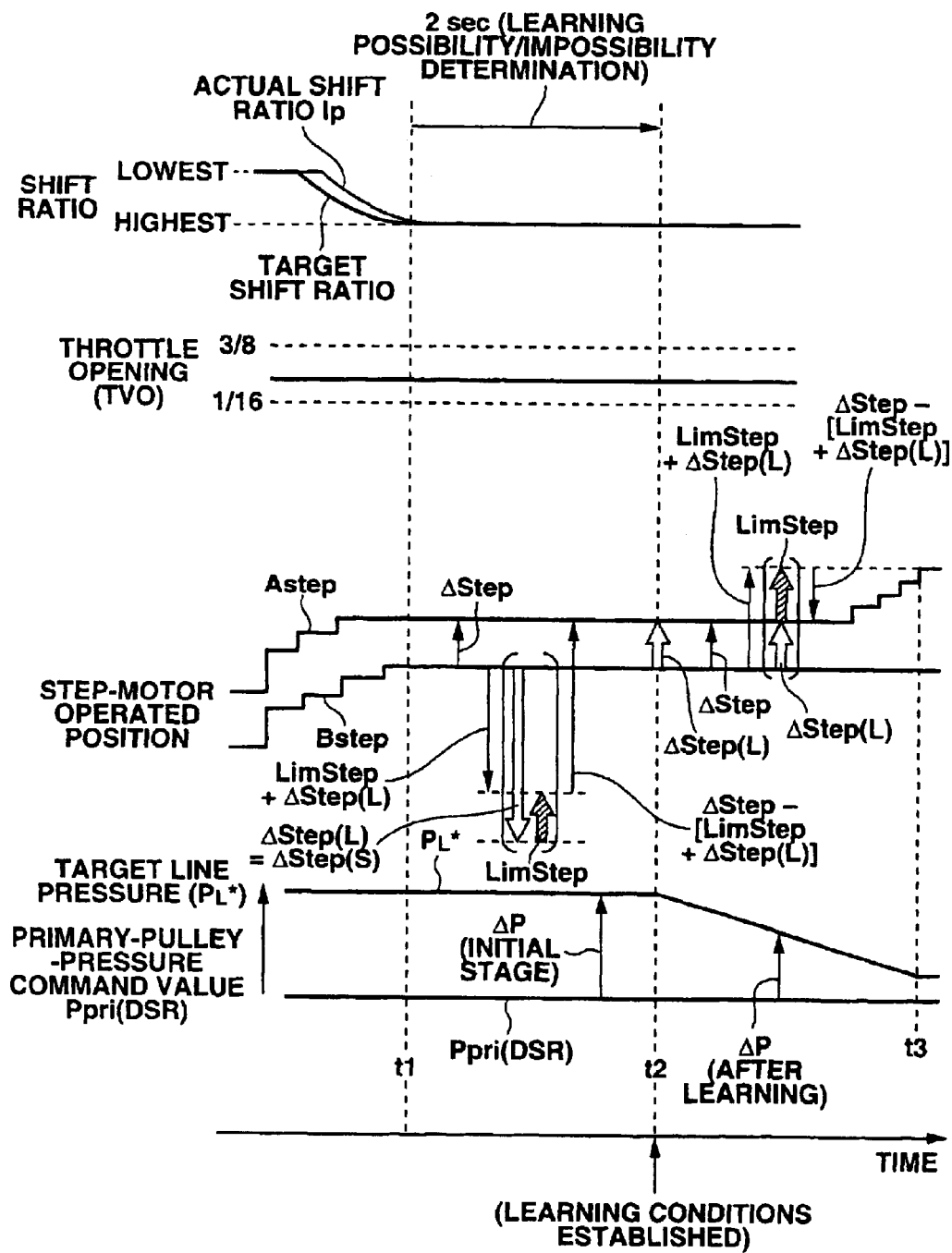
FIG. 19 is a chart similar to FIG. 8, showing line-pressure control in the second embodiment.

Referring to FIG. 19 which shows operation at start time, line-pressure control in the second embodiment is described. Learning possibility/impossibility determination is carried out about a duration of 2 sec from an instant t1 where after the vehicle starts with the throttle opening TVO being a given low value, the actual shift ratio Ip corresponds roughly to the target shift ratio to achieve the normal state with highest shift ratio selected to a set time. Specifically, first, the learning displacement amount ΔStep(L) is set at the initial learning value ΔStep(S) which allows full increase in the line pressure $P_L$. At commencement of the learning, the initial value ΔStep(S) of the learning displacement amount ΔStep(L) is set at a negative value which achieves the line pressure $P_L$ required to make the relationship between the step number Step of the step motor 27 and the shift ratio Ip correspond to the theoretical Step-Ip characteristic as shown in FIG. 21.

At an instant t2 where it is determined that the conditions are met during a set time, e.g. 2 sec, conditions that the line pressure $P_L$ is fully provided through setting of the learning displacement amount ΔStep(S), the shift ratio is in the highest-shift-ratio selected state, the vehicle is in the normal cruising state having no variation occurs in the actual step number Astep of the step motor 27 or the actual shift ratio Ip corresponds roughly to a target shift ratio, and the throttle opening TVO is low, the learning is carried out about the step-motor operated-position displacement amount ΔStep between the actual step number Astep and the actual-shift-ratio corresponding step number Bstep. This displacement amount ΔStep or the learning displacement amount ΔStep (L) is updated, in accordance with which line-pressure control after the instant t2 is carried out.

Specifically, the deviation ΔStep between the actual-shift-ratio corresponding step number Bstep and the actual step number Astep, i.e. step-motor operated-position displacement amount, is obtained by ΔStep=Astep−Bstep. The sum of the allowable displacement amount LimStep and the learning displacement amount ΔStep(L) at the instant t2 is subtracted from the step-motor operated-position displacement amount ΔStep to obtain part (ΔStep−(LimStep+ΔStep(L)) of the displacement amount ΔStep exceeding the sum of the allowable displacement amount LimStep and the learning displacement amount ΔStep(L), which is integrated to obtain an integral value. The line-pressure correction amount ΔP is determined to reduce the integral value. The target line pressure $P_L$* is obtained in accordance with the line-pressure correction amount ΔP and the primary-pulley-pressure command value Ppri(DSR). Thus, as seen from the secular change in the line pressure $P_L$* after the instant T2, the line pressure $P_L$ is backed and reduced by part of mounting error of the step motor 27, which is carried out gently due to existence of the line-pressure correction-amount change-rate limiter 35 as shown in FIG. 18.

With progress of a reduction in the line pressure $P_L$ as source pressure, the primary-pulley pressure Ppri produced therefrom is provided difficultly to have occurrence of displacement from the target shift ratio. Prevention of this displacement needs an increase in the primary-pulley pressure Ppri, leading to a stepwise increase in the actual step number Astep of the step motor 27. With this, it is determined that the line pressure $P_L$ is fully provided at an instant t3 where the step-motor operated-position displacement amount ΔStep reaches the value (LimStep+ΔStep(L)), thus finishing an increase in the actual step number Astep.

Figure 20:
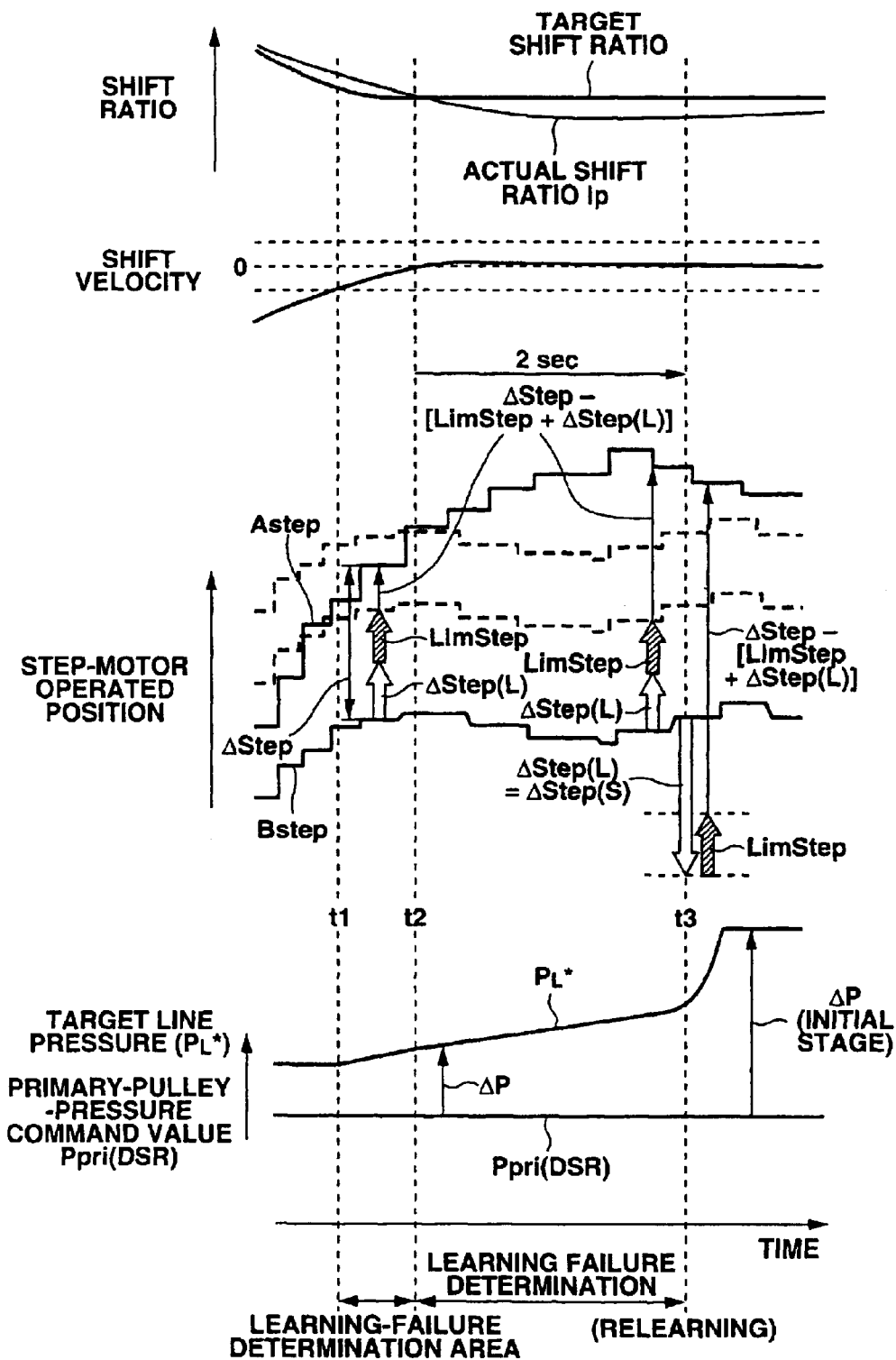
FIG. 20 is a chart similar to FIG. 19, showing line-pressure control in the second embodiment.

FIG. 20 shows operation for determining whether or not the learning ends in failure or achieves success. Concerning this determination, as described above and as seen from a period from the instant t1 to the instant t2, when the learning displacement amount ΔStep(L) is not equal to the initial learning value ΔStep(S), that the vehicle is in the normal cruising state where the shift velocity is smaller than a minute set value, that an absolute value of the step-motor operated-position displacement amount ΔStep, i.e. step-motor control deviation, is equal to or greater than a set value, i.e. the state of having greater step-motor control deviation (which means occurrence of control hunting) occurs even though the learning is finished to provide normal cruising, and that this state is continued over a set time of, e.g. 2 sec from the instant t2 to reach the instant t3, it is determined that the learning ends in failure. If the learning ends in failure, with the learning displacement amount ΔStep(L) being set at initial learning value ΔStep(S) which allows full increase in the line pressure $P_L$ as shown after the instant t3, the same processing as that after the instant t1 shown in FIG. 19 is carried out to redo the learning.

Having described the present invention in connection with the illustrative embodiments, it is noted that the present invention is not limited thereto, and various changes and modifications can be made without departing from the scope of the present invention.

The entire teachings of Japanese Patent Application P2002-260200 filed Sep. 5, 2002 and Japanese Patent Application P2002-260196 filed Sep. 5, 2002 are incorporated hereby by reference.

What is claimed is:

1. A V-belt type continuously variable transmission (CVT), comprising:
   primary and secondary pulleys arranged on input and output sides, the pulleys having V-grooves, the pulleys being subjected to primary-pulley and secondary-pulley pressures produced from a line pressure;

a V-belt looped over the primary and secondary pulleys to engage in the V-grooves;

a shift actuator having a first position corresponding to a target shift ratio, the shift actuator being operated to the first position to change a width of the V-grooves through a differential pressure between the primary-pulley and secondary-pulley pressures, achieving the target shift ratio; and an electronic control unit (ECU) which controls the shift actuator, the ECU being so constructed as to:

calculate a second position of the shift actuator corresponding to an actual shift ratio through conversion of the actual shift ratio expressed by a rotational-speed ratio between the primary and secondary pulleys, calculate a displacement between the second position of the shift actuator and an actual position thereof, calculate a correction amount of the line pressure to reduce the displacement, and correct the line pressure in accordance with the correction amount.

2. The V-belt type CVT as claimed in claim 1, wherein the ECU integrates the displacement to obtain an integral value, the correction amount being determined to reduce the integral value.

3. The V-belt type CVT as claimed in claim 2, wherein the ECU integrates part of the displacement exceeding an allowable displacement amount.

4. The V-belt type CVT as claimed in claim 2, wherein the ECU converts one of the displacement and the integral value to an over or short amount of the line pressure, the correction amount being determined to reduce the over or short amount.

5. The V-belt type CVT as claimed in claim 2, wherein the ECU holds the integral value immediately previously obtained when a change velocity of the actual shift ratio is equal to or greater than a set value.

6. The V-belt type CVT as claimed in claim 1, wherein the ECU resets the correction amount to zero when the actual shift ratio is equal to or greater than a low-side set value.

7. The V-belt type CVT as claimed in claim 1, wherein the ECU sets upper and lower limits for the correction amount.

8. The V-belt type CVT as claimed in claim 1, wherein the ECU sets upper and lower limits for a rate of change with respect to time of the correction amount.

9. The V-belt type CVT as claimed in claim 1, wherein the ECU calculates the correction amount to have the displacement corresponding to an allowable displacement amount.

10. The V-belt type CVT as claimed in claim 9, wherein the ECU calculates a learning displacement amount of the displacement through a learning carried out when achieving a stable shift state, the allowable displacement amount being increased by the learning displacement amount.

11. The V-belt type CVT as claimed in claim 10, wherein the ECU sets an initial value of the learning displacement amount at commencement of the learning, the initial value achieving the line pressure required to make a relationship between the second position of the shift actuator and the shift ratio correspond to a theoretical characteristic.

12. The V-belt type CVT as claimed in claim 10, wherein the learning is carried out when the actual shift ratio is a highest shift ratio.

13. The V-belt type CVT as claimed in claim 10, wherein the learning is carried out when a vehicle is in a normal cruising state having no variation in the target shift ratio.

14. The V-belt type CVT as claimed in claim 10, wherein the learning is carried out when the stable shift state is continued for a set time.

15. The V-belt type CVT as claimed in claim 9, wherein the ECU integrates a value obtained by subtracting a sum of the allowable displacement amount and the learning displacement amount from the displacement to obtain an integral value, the correction amount being determined to reduce the integral value.

16. The V-belt type CVT as claimed in claim 9, wherein the ECU holds the integral value immediately previously obtained when the actual shift ratio is equal to or greater than a set value.

17. A V-belt type continuously variable transmission (CVT), comprising:

primary and secondary pulleys arranged on input and output sides, the pulleys having V-grooves;

a V-belt looped over the primary and secondary pulleys to engage in the V-grooves;

a hydraulic circuit which produces from a line pressure primary-pulley and secondary-pulley pressures applied to the primary and secondary pulleys;

a shift actuator having a first position corresponding to a target shift ratio, the shift actuator being operated to the first position to change a width of the V-grooves through a differential pressure between the primary-pulley and secondary-pulley pressures, achieving the target shift ratio; and an electronic control unit (ECU) which controls the shift actuator, the ECU being so constructed as to:

calculate a second position of the shift actuator corresponding to an actual shift ratio through conversion of the actual shift ratio expressed by a rotational-speed ratio between the primary and secondary pulleys, calculate a displacement between the second position of the shift actuator and an actual position thereof, calculate a correction amount of the line pressure to reduce the displacement, and correct the line pressure in accordance with the correction amount.

18. A V-belt type continuously variable transmission (CVT), comprising:

primary and secondary pulleys arrange on input and output sides, the pulleys having V-grooves, the pulleys being subjected to primary-pulley and secondary-pulley pressures produced from a line pressure;

a V-belt looped over the primary and secondary pulleys to engage in the V-grooves;

a shift actuator having a first position corresponding to a target shift ratio, the shift actuator being operated to the first position to change a width of the V-grooves through a differential pressure between the primary-pulley and secondary-pulley pressures, achieving the target shift ratio; and an electronic control unit (ECU) which controls the shift actuator, the ECU being so constructed as to:

calculate a second position of the shift actuator corresponding to an actual shift ratio through conversion of the actual shift ratio expressed by a rotational-speed ratio between the primary and secondary pulleys, calculate a displacement between the second position of the shift actuator and an actual position thereof, calculate a correction amount of the line pressure to have the displacement corresponding to an allowable displacement amount, calculate a learning displacement amount of the displacement through a learning carried out when achieving a stable shift state, the allowable displacement amount being increased by the learning displacement amount, and correct the line pressure in accordance with the correction amount.

19. A method of controlling a line pressure in a V-belt type continuously variable transmission (CVT), the V-belt type CVT comprising:

primary and secondary pulleys arranged on input and output sides, the pulleys having V-grooves, the pulleys being subjected to primary-pulley and secondary-pulley pressures produced from the line pressure;

a V-belt looped over the primary and secondary pulleys to engage in the V-grooves; and a shift actuator having a first position corresponding to a target shift ratio, the shift actuator being operated to the first position to change a width of the V-grooves through a differential pressure between the primary-pulley and secondary-pulley pressures, achieving the target shift ratio, the method comprising:

calculating a second position of the shift actuator corresponding to an actual shift ratio through conversion of the actual shift ratio expressed by a rotational-speed ratio between the primary and secondary pulleys;

calculating a displacement between the second position of the shift actuator and an actual position thereof;

calculating a correction amount of the line pressure to reduce the displacement; and correcting the line pressure in accordance with the correction amount.

20. The method as claimed in claim 19, further comprising integrating the displacement to obtain an integral value, the correction amount being determined to reduce the integral value.

21. The method as claimed in claim 20, further comprising integrating part of the displacement exceeding an allowable displacement amount.

22. The method as claimed in claim 20, further comprising converting one of the displacement and the integral value to an over or short amount of the line pressure, the correction amount being determined to reduce the over or short amount.

23. The method as claimed in claim 20, further comprising holding the integral value immediately previously obtained when the actual shift ratio is equal to or greater than a set value.

24. The method as claimed in claim 19, further comprising resetting the correction amount to zero when the actual shift ratio is equal to or greater than a low-side set value.

25. The method as claimed in claim 19, further comprising setting upper and lower limits for the correction amount.

26. The method as claimed in claim 19, further comprising setting upper and lower limits for a rate of change with respect to time of the correction amount.

27. The method as claimed in claim 19, further comprising determining the correction amount to have the displacement corresponding to an allowable displacement amount.

28. The method as claimed in claim 27, further comprising calculating a learning displacement amount of the displacement through a learning carried out when achieving a stable shift state, the allowable displacement amount being increased by the learning displacement amount.

29. The method as claimed in claim 28, further comprising setting an initial value of the learning displacement amount at commencement of the learning, the initial value achieving the line pressure required to make a relationship between the second position of the shift actuator and the shift ratio correspond to a theoretical characteristic.

30. The method as claimed in claim 28, wherein the learning is carried out when the actual shift ratio is a highest shift ratio.

31. The method as claimed in claim 28, wherein the learning is carried out when a vehicle is in a normal cruising state having no variation in the target shift ratio.

32. The method as claimed in claim 28, wherein the learning is carried out when the stable shift state is continued for a set time.

33. The method as claimed in claim 19, further comprising integrating a value obtained by subtracting a sum of the allowable displacement amount and the learning displacement amount from the displacement to obtain an integral value, the correction amount being determined to reduce the integral value.

34. The method as claimed in claim 19, further comprising holding the integral value immediately previously obtained when the actual shift ratio is equal to or greater than a set value.

* * * * *